United States Patent
Kurokawa

(10) Patent No.: US 12,528,534 B2
(45) Date of Patent: Jan. 20, 2026

(54) STEERING DEVICE

(71) Applicant: NSK LTD., Tokyo (JP)

(72) Inventor: Yoshifumi Kurokawa, Ann Arbor, MI (US)

(73) Assignee: NSK LTD., Tokyo (JP)

( * ) Notice: Subject to any disclaimer, the term of this patent is extended or adjusted under 35 U.S.C. 154(b) by 1111 days.

(21) Appl. No.: 17/602,018

(22) PCT Filed: Apr. 10, 2020

(86) PCT No.: PCT/JP2020/016223
§ 371 (c)(1),
(2) Date: Oct. 7, 2021

(87) PCT Pub. No.: WO2020/213546
PCT Pub. Date: Oct. 22, 2020

(65) Prior Publication Data
US 2022/0212715 A1    Jul. 7, 2022

Related U.S. Application Data

(60) Provisional application No. 62/835,769, filed on Apr. 18, 2019.

(51) Int. Cl.
*B62D 5/04* (2006.01)
*B62D 1/187* (2006.01)
*B62D 6/00* (2006.01)

(52) U.S. Cl.
CPC .......... *B62D 5/0463* (2013.01); *B62D 1/187* (2013.01); *B62D 6/008* (2013.01)

(58) Field of Classification Search
CPC .......... B62D 1/18; B62D 1/187; B62D 1/189; B62D 5/0463; B62D 5/409
See application file for complete search history.

(56) References Cited

U.S. PATENT DOCUMENTS

| | | | |
|---|---|---|---|
| 2003/0085560 A1 | 5/2003 | Shibayama | |
| 2005/0076736 A1* | 4/2005 | Sato | B62D 1/187 |
| | | | 74/493 |
| 2008/0027609 A1* | 1/2008 | Aoki | B62D 5/0463 |
| | | | 701/43 |

(Continued)

FOREIGN PATENT DOCUMENTS

| | | |
|---|---|---|
| JP | 59-63265 A | 4/1984 |
| JP | 2003-127874 A | 5/2003 |
| JP | 2003-205846 A | 7/2003 |

(Continued)

OTHER PUBLICATIONS

JP2009012555A—translation (Year: 2009).*

(Continued)

*Primary Examiner* — Christopher B Wehrly
(74) *Attorney, Agent, or Firm* — Sughrue Mion, PLLC

(57) ABSTRACT

A steering device includes a steering wheel, a steering shaft, a steering column, a tilt position adjustment mechanism for tilting the steering column, and a joint for tiltably connecting the steering shaft with a fixed-side rotating body which is supported on a vehicle body side without being interlocked with a tilt operation performed by the tilt position adjustment mechanism. The joint is disposed closer to a steering wheel side than the fixed-side rotating body is.

6 Claims, 22 Drawing Sheets

(56) References Cited

U.S. PATENT DOCUMENTS

2016/0288824 A1\* 10/2016 Mose ................... B62D 5/0463

FOREIGN PATENT DOCUMENTS

| | | | |
|---|---|---|---|
| JP | 2008-179318 A | | 8/2008 |
| JP | 2009-12555 A | | 1/2009 |
| JP | 2009012555 A | \* | 1/2009 |
| JP | 2009-35041 A | | 2/2009 |
| JP | 2013-216172 A | | 10/2013 |

OTHER PUBLICATIONS

International Search Report (PCT/ISA/210) issued Jun. 30, 2020 by the International Searching Authority in counterpart International Patent Application No. PCT/JP2020/016223.
Written Opinion (PCT/ISA/237) issued Jun. 30, 2020 by the International Searching Authority in counterpart International Patent Application No. PCT/JP2020/016223.

\* cited by examiner

STEERING DEVICE

TECHNICAL FIELD

The present invention relates to a steering device.

BACKGROUND ART

FIG. 19 shows an example of a steering device for automobile that s known in the related art. The steering device includes a steering wheel 1 to be operated by a driver, a steering shaft 2, a steering column 3, a pair of universal joints (Cardan joints) 4a and 4b, an intermediate shaft 5, a rack-and-pinion steering gear unit 6, and a pair of tie rods 7.

In the following description, a front-rear direction, a width direction, and an upper-lower direction of the steering device refer to a front-rear direction, a width direction, and an upper-lower direction of a vehicle body to which the steering device is assembled. Regarding the width direction, a right side and a left side when the vehicle body is disposed such that a traveling direction is upward as viewed from directly above are referred to as "right" and "left", respectively.

The steering column 3 is configured in a tubular shape, and is disposed to be inclined downward toward the front, and a part of the steering column 3 is supported by the vehicle body. The steering shaft 2 is rotatably supported inside the steering column 3. The steering wheel 1 is supported and fixed to a rear end portion of the steering shaft 2. A front end portion of the steering shaft 2 is connected to a pinion shaft 8 of the steering gear unit 6 via the pair of universal joints 4a and 4b and the intermediate shaft 5. Therefore, the pinion shaft 8 is rotated by rotating the steering wheel 1. The rotation of the pinion shaft 8 is converted into linear motion of a rack shaft (not shown), and thus the pair of tie rods 7 are pushed and pulled. Thus, a steered angle corresponding to an operation amount of the steering wheel 1 is applied to a pair of steered wheels.

At this time, according to a detection signal of a torque sensor (not shown) in a motor housing 9, a vehicle speed, and the like, an electric motor 10 rotates with a predetermined rotational torque in a forward or reverse direction, and the rotation is transmitted to a sensor output shat 11 via a reduction gear (not shown). As a result, steering assist is realized.

As an electric power steering device as described above, a steer-by-wire steering system that transmits an operation of the steering wheel 1 by an electric signal has been developed (for example, Patent Document 1). In the steer-by-wire steering system, as shown is FIG. 20, instead of the electric motor 10, a reaction force generator 15 that applies a steering reaction force to the driver (steering wheel 1) is provided on the steering shaft 2. The reaction force generator 15 includes a reaction force actuator as a drive source. A steering angle sensor 13 and a torque sensor 14 are provided on the steering shaft 2. The reaction force generator 15 includes therein a steering-side resolver 16 that detects a rotation angle of the reaction force actuator.

In such a steering system, an electromagnetic clutch that can physically engage and disengage the steering shaft 2 and a steering dive unit that steer-drives the steered wheels may be disposed on a vehicle body front side of the reaction force generator 15, or a drive signal for driving the steering drive unit may be output from the reaction force generator 15.

For example, in a case where an electromagnetic cutch is used, the steering drive unit does not transmit the rotation of the steering shaft 2 to a pinion shaft 8 side in a state where the electromagnetic cutch is disengaged, and transmits the steering torque received from the steering shaft 2 to the pinion shaft 8 side in a state where the electromagnetic clutch is engaged. Further, the steering drive unit transmits reaction torque received from the steered wheels to a steering shaft 2 side.

PRIOR ART DOCUMENT

Patent Document

Patent Document 1: IP-A-2009-35041

SUMMARY OF INVENTION

Technical Problem

In general, the steering column is disposed below a top bracket 19 fixed to a vehicle body side and behind a dash panel 20 provided on a front side of the vehicle body. In the steer-by-wire steering system described above, in a case where the steering column 3 shown in FIG. 20 is used, as shown in FIG. 21, the reaction force generator 15 as a fixed-side rotating body, which is a heavy object, is disposed at a front end portion of the steering column 3. Therefore, when an extension stroke of the steering column 3 is increased, a distance L from a tilt pivot Pv to the reaction force generator 15 is increased. FIG. 22 schematically shows a periphery of the steering device as viewed from a lateral side of the vehicle body.

When a weight of the reaction force generator 15 is supported by the steering column 3 as described above, the steering column 3 is easily rotated (tilted) around the tilt pivot Pv even when the tilt pivot Pv is in a fixed state. As the distance L increases, a load on the tilt pivot Pv due to the weight of the reaction force generator 15 increases. Therefore, the reaction force generator 15 can be reliably supported by the steering column 3 by increasing rigidity around the tilt pivot Pv, but in that case, a weight of the steering device increases and a structure is complicated.

Further, a cable 18 for supplying power to the reaction force generator 15 is dragged when the steering column 3 is tilted, and contact or friction with the dash panel 20 or the like may occur depending on usage conditions, and the cable 18 may be broken or damaged.

When the reaction force generator 15 moves greatly due to the tilt operation, it is difficult to dispose the clutch on a reaction force generator 15 side. Therefore, the reaction force generator 15 can be assembled to the vehicle body separately from the steering column 3, but there is a portion where the shaft is best between the reaction force generator 15 side and the steering column 3 side. Therefore, in this configuration, assemblability of the steering device is lowered.

As described above, there are many problems in arrangement of the reaction force generator 15 to the vehicle body, and there is room for examination.

An object of the present invention is to provide a steering device in which a fixed-side rotating body which is a heavy object can be disposed without interfering with a tilt operation of a steering column and without lowering assemblability in a steer-by-wire steering system.

Solution to Problem

The present invention has the following configurations.
A steering device includes:

a steering wheel;
a steering shaft connected to the steering wheel;
a steering column configured to rotatably support the steering shaft on an inner diameter side thereof and supported by a vehicle body;
a tilt position adjustment mechanism configured to tilt the steering column; and
a joint configured to connect the steering shaft with a fixed-side rotating body tiltably supported on a vehicle body side without being interlocked with a tilt operation performed by the tilt position adjustment mechanism, wherein
the joint is disposed closer to a steering wheel side than the fixed-side rotating body is.

Advantageous Effects of Invention

According to the present invention, in the steer-by-wire steering system, the fixed-side rotating body which is a heavy object can be disposed without interfering with the tilt operation of the steering column and without lowering the assemblability.

BRIEF DESCRIPTION OF DRAWINGS

FIG. 1g is a schematic side view of a main part of a steering device according to a twelfth embodiment as viewed from a lateral side.

DESCRIPTION OF EMBODIMENT

Hereinafter, embodiments of the present invention will be described in detail with reference to the drawings.
A steering device of each embodiment to be described below is a steer-by-wire steering device which steers steered wheels to left and right by detecting a steering angle and a steering force with a sensor and transmitting the detected steering angle and steering force to a steering drive unit as an electric signal.

First Embodiment

Figure 1:
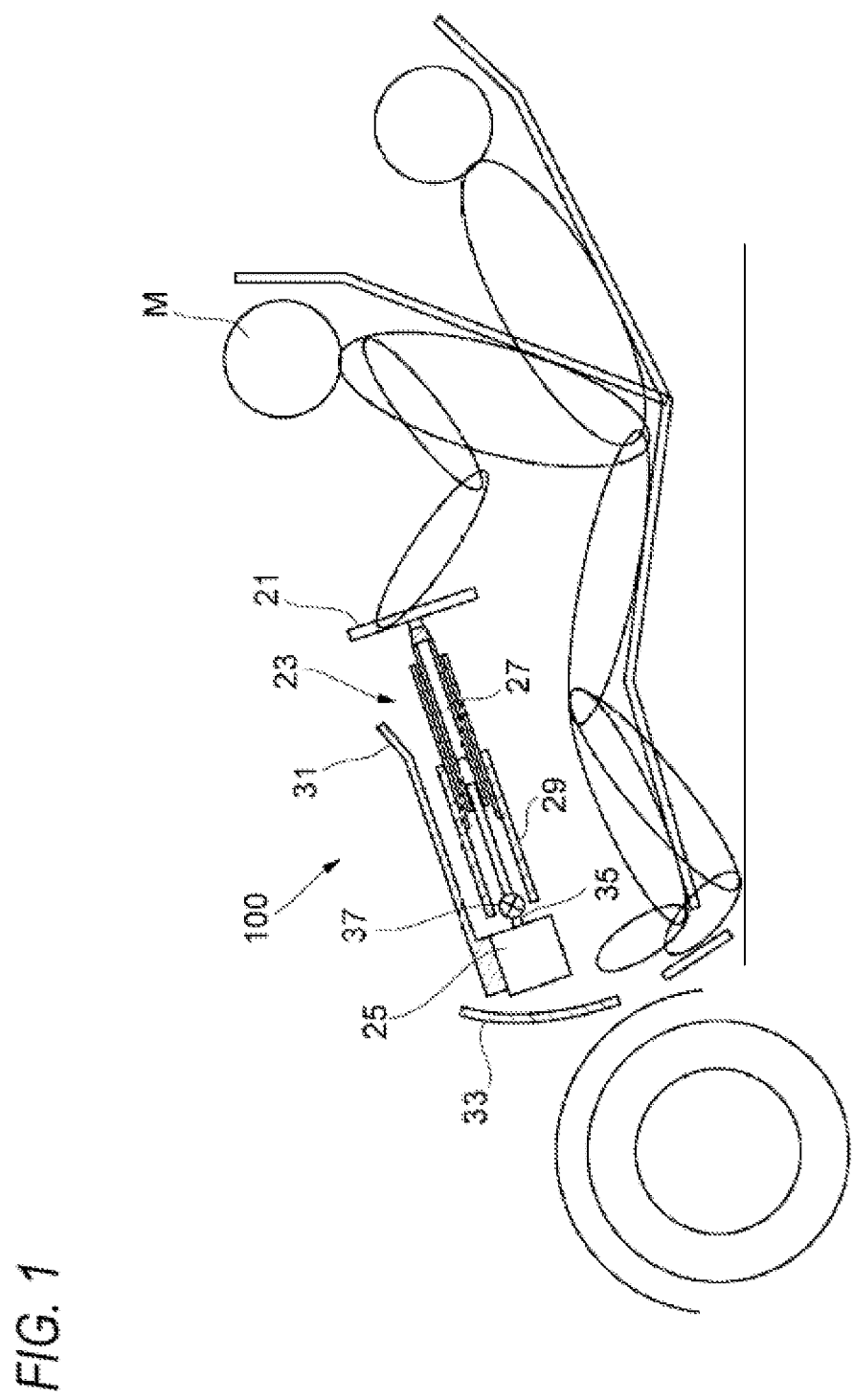
FIG. 1 is a side view schematically showing a driver seat of a vehicle body, to which a steering device according to a first embodiment is assembled, and a peripheral portion thereof.
Figure 2:
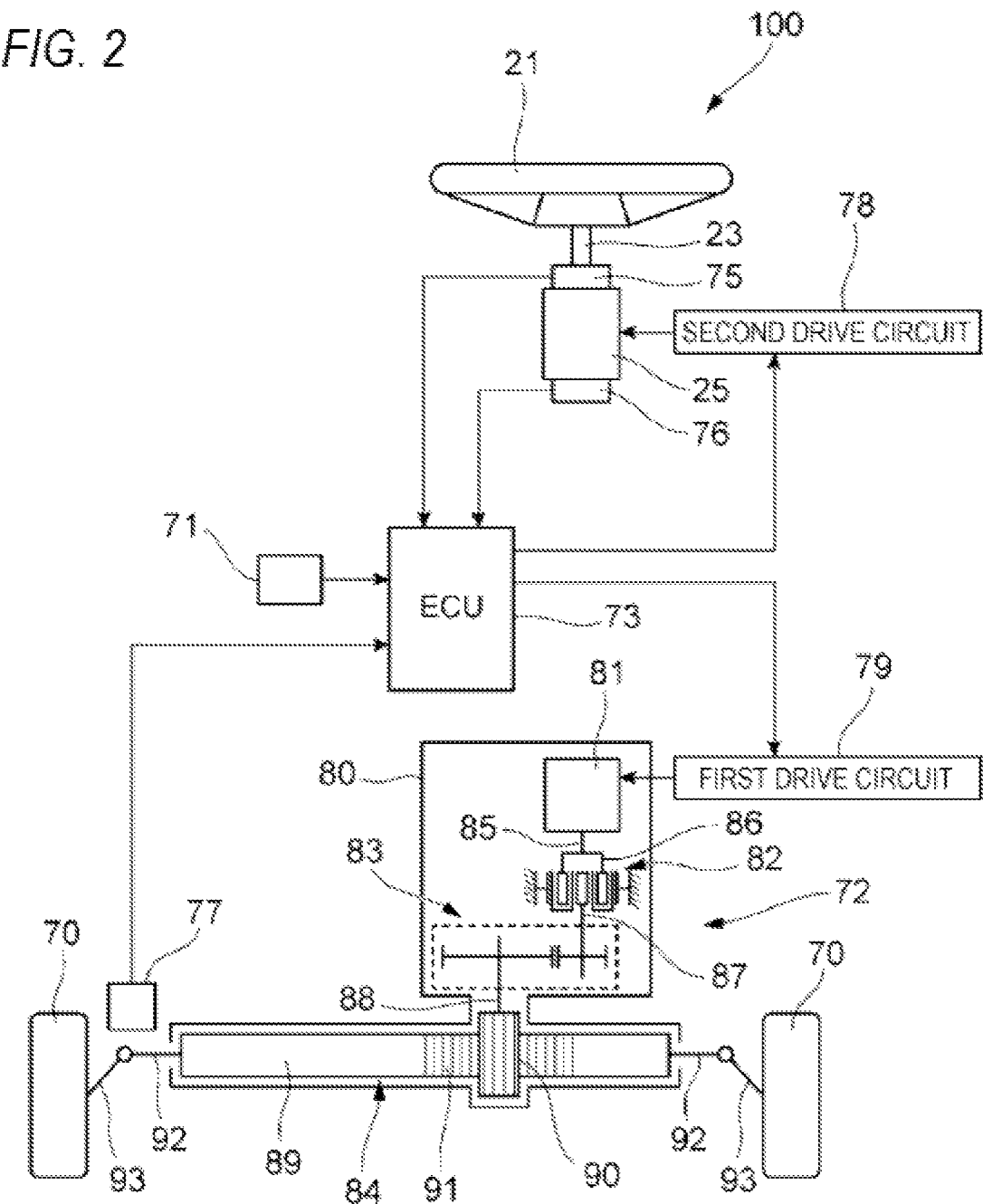
FIG. 2 is a schematic diagram of a periphery of a steer-by-wire steering device according to the first embodiment.

FIGS. 1 and 2 are side views schematically showing a driver seat of a vehicle body, to which a steering device 100 according to a first embodiment is assembled, and a peripheral portion thereof.
The steering device 100 includes a steering wheel 21, a steering column shaft 23, a tilt position adjustment mechanism, and a joint 37. The steering column shaft 23 is supported by a top bracket 31 to which the steering wheel 21 is attached and which is fixed integrally with the vehicle body.
A fixed-side rotating body which is supported on a vehicle body side without being interlocked with a tilt operation performed by the tilt position adjustment mechanism is connected to the joint 37. The fixed-side rotating body has a relatively large weight, and includes a dive shaft 35 and a reaction force generator 25 which generates, on the drive shaft 35, a reaction force corresponding to steering scanning applied to the steering wheel 21. The reaction force generator 25 includes a reaction force actuator for applying a steering reaction force to a driver M (steering wheel 21). The fixed-side rotating body is not limited to the reaction force generator 25, and may be another member (a rotating shaft body or any individual member having a rotating portion in a part thereof).
The steering column shaft 23 is provided with a steering angle sensor 75 for detecting a steering angle as a steering amount of the driver M and a torque sensor 76 for detecting a steering torque as a steering amount of the driver M.
In the steer-by-wire steering device 100 according to the present embodiment, the steering wheel 21, which is a steering member, and a pair of steered wheels 70, which are a pair of left and right front wheels, are mechanically separated. Further, a rotation amount a rotational force, and the like of the steering wheel 21 are detected by various sensors, and an operation of an actuator 72 mechanically connected to the steered wheels 70 is controlled according to the sensor information so as to adjust a steered angle (tire angle) of the pair of steered wheels 70.

The steering angle sensor 75 detects the steering angle of the steering wheel 21, and is assembled to a portion of the reaction force generator 25 so as to be adjacent therewith on a vehicle rear side, in an example shown in FIG. 2. The torque sensor 76 detects the steering torque applied to the steering wheel 21, and is assembled to a portion of the reaction force generator 25 so as to be adjacent therewith on a vehicle front side, in the example shown in FIG. 2. The steered angle sensor 77 detects a steered angle of the pair of steered wheels 70. In the example shown in FIG. 2, the steered angle sensor 77 is disposed in a vicinity of one of the steered wheels 70 (left side in FIG. 2).

Signals from the steering angle sensor 75, the torque sensor 76, the steered angle sensor 77, and sensors 71 provided in the vehicle are input to an electronic control unit (ECU) 73. The sensors 71 here include a vehicle speed sensor for detecting a vehicle speed which is a speed of the vehicle, an accelerator operation amount sensor for detecting an operation amount of an accelerator pedal of the driver M, a brake operation amount sensor for detecting an operation amount of a brake pedal of the driver M, a vertical acceleration sensor for detecting a vertical acceleration of the vehicle, a lateral acceleration sensor for detecting a lateral acceleration of the vehicle, a yaw rate sensor for detecting a yaw rate of the vehicle, and the like.

The ECU 73 sets a target steered angle according to a steering angle detected by the steering angle sensor 75 and a vehicle speed detected by the vehicle speed sensor. Then, the ECU 73 performs drive control (steering control) on the actuator 72 via a first drive circuit 79 according to a deviation between the target steered angle and the steered angle detected by the steered angle sensor 77. Thus, the steered angle of the steered wheels 70 is adjusted to the target steered angle. Further, the ECU 73 performs drive control (reaction force control) on the reaction force generator 25 via a second dive circuit 78 according to detection signals of the steering angle sensor 75, the torque sensor 76, the steered angle sensor 77, and the sensors 71. Thus, an appropriate reaction force in a direction opposite to a steering direction of the steering wheel 21 is applied to the steering column shaft 23.

The actuator 72 includes a housing 80 that is supported and fixed to the vehicle body, an electric motor 81 that is a drive source, a reverse input cutoff clutch 82, a speed reduction mechanism 83, and a rack-and-pinion mechanism 84 that is a rotary-to-linear conversion mechanism.

The electric motor 81 has a drive shaft (output shaft) 85 that can be rotationally driven in both directions, and is supported by the housing 80. The steering control is performed by controlling a rotation direction, a rotation amount, and the like of the drive shaft 85.

The reverse input cutoff clutch 82 is a lock-type reverse input cutoff clutch, and is accommodated inside the housing 80. The reverse input cutoff clutch 82 has a reverse input cutoff function of transmitting all rotational torque received from an input member 86 to an output member 87, while not transmitting rotational torque reversely received from the output member 87 to the input member 86 or transmitting only a part of the rotational torque to the input member 86 and cutting off the remaining part of the rotational torque. In an example shown in FIG. 2, the input member 56 is connected to the drive shaft 85 of the electric motor 81 so as to be able to transmit torque.

The speed reduction mechanism 83 is accommodated inside the housing 80, reduces a speed of the rotational torque received from an input portion, and outputs the rotational torque from an output portion. In the example shown in FIG. 2, the speed reduction mechanism 83 is a parallel shaft gear mechanism configured by a plurality of gears, whose rotation center axes are arranged in parallel, meshing with each other. The input portion of the speed reduction mechanism 83 is connected to the output member 87 of the reverse input cutoff clutch 82 so as to be able to transmit torque.

As the speed reduction mechanism 83, in addition to the parallel shaft gear mechanism various speed reduction mechanisms such as a planetary gear mechanism, a bevel gear mechanism, a wave gear mechanism, a cycloid speed reduction mechanism, a belt drive type speed reduction mechanism, a chain drive type speed reduction mechanism, a wedge roller type traction drive speed reduction mechanism, and a combination thereof can be adopted.

The rack-and-pinion mechanism 84 includes a pinion shaft 88 that is a rotating member, and a rack shaft 89 that is a linear motion member, and is accommodated inside the housing 80. The pinion shaft 88 has pinion teeth 90 at a part thereof in an axial direction. The rack shaft 89 has rack teeth 91 on aside surface of an axially intermediate portion thereof. The rack shaft 89 is supported so as to be displaced only in the axial direction with respect to the housing 80 in a state where the axial direction of the rack shaft 89 coincides with the width direction of the vehicle (a left-right direction in FIG. 2). Further the pinion shaft 88 is supported to be rotatable around an own axis with respect to the housing 80, in a state where a center axis of the pinion shaft 88 is disposed at a position twisted with respect to a center axis of the rack shaft 89 and the pinion teeth 90 are meshed with the rack teeth 91. The rack-and-pinion mechanism 84 having such a configuration can convert rotational motion of the pinion shaft 88 into linear motion (axial motion) of the rack shaft 89. The pinion shaft 88 is connected to the output portion of the speed reduction mechanism 83 so as to be able to transmit the rotational torque.

Base end portions of a pair of tie rods 92 are respectively coupled to both axial end portions of the rack shaft 89 via spherical joints (not shown). Tip end portions of the tie rods 92 are located outside the housing 80, and are swingably coupled to base end portions of a pair of left and right knuckle arms 93, respectively. Tip end portions of the pair of left and right knuckle arms 93 are fixed to a pair of left and right knuckles (not shown), respectively. Each of the pair of left and right knuckles is supported so as to be swingable around a kingpin (not shown) with respect to the vehicle body. The pair of right and left steered wheels 70 is rotatably supported by the pair of left and right knuckles via hub unit bearings (not shown), respectively.

When the steering wheel 21 is operated, the target steered angle is set by the ECU 73, the electric motor 81 is driven, and the drive shaft 85 rotates, the rotation is transmitted to the pinion shaft 88 via the reverse input cutoff clutch 82 and the speed reduction mechanism 83. Then, the rotation of the pinion shaft 88 is converted into linear motion of the rack shaft 89, and the pair of left and night tie rods 92 are pushed and pulled. As a result, the pair of left and right knuckle arms 93 is displaced in a swing manner, thereby the pair of left and right knuckles displaced in a swing manner around the kingpins, and the steered angle of the pair of left and right steered wheels 70 is adjusted to the target steered angle.

When rotational torque is reversely input to the output member 87 of the reverse input cutoff clutch 82 in response to reaction forces received by the steered wheels 70 from a road surface, the reverse input cutoff clutch 82 prevents rotation of the output member 87 (locks the output member 87) so as not to transmit the rotational torque reversely received from the output member 87 to the input member 86. Alternatively, the rotation of the output member 87 is limited (the output member 87 is half-locked), only a part of the rotational torque reversely received from the output member 87 is transmitted to the input member 86, and the remaining part is cut off. As a result, even if the driver M releases his/her hand from the steering wheel 21, the steered angle of the steered wheels 70 can be maintained when the output member 87 is locked. Further, when the output member 87 is half-locked, the steered angle of the steered wheels 70 can be prevented from rapidly changing. Therefore, it is not necessary for the electric motor 81 to generate a forme for maintaining the steered angle of the steered wheels 70 and preventing the steered angle of the steered wheels 70 from rapidly changing in response to the reaction forces received by the steered wheels 70 from the road surface. Accordingly, power consumption of the electric motor 81 can be reduced.

Figure 3:
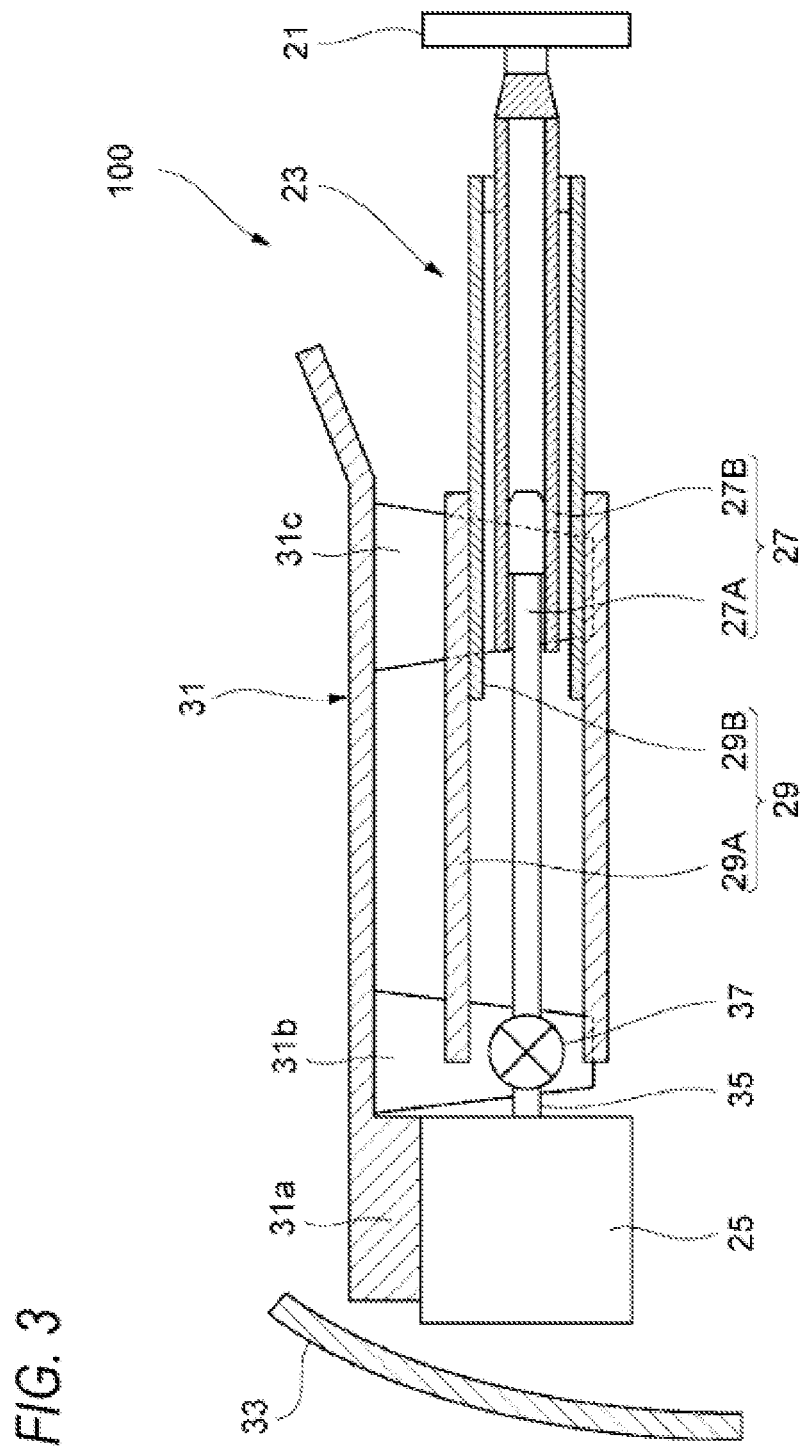
FIG. 3 is a schematic side view of a main part of the steering device shown in FIG. 1 as viewed from a lateral side.
Figure 4:
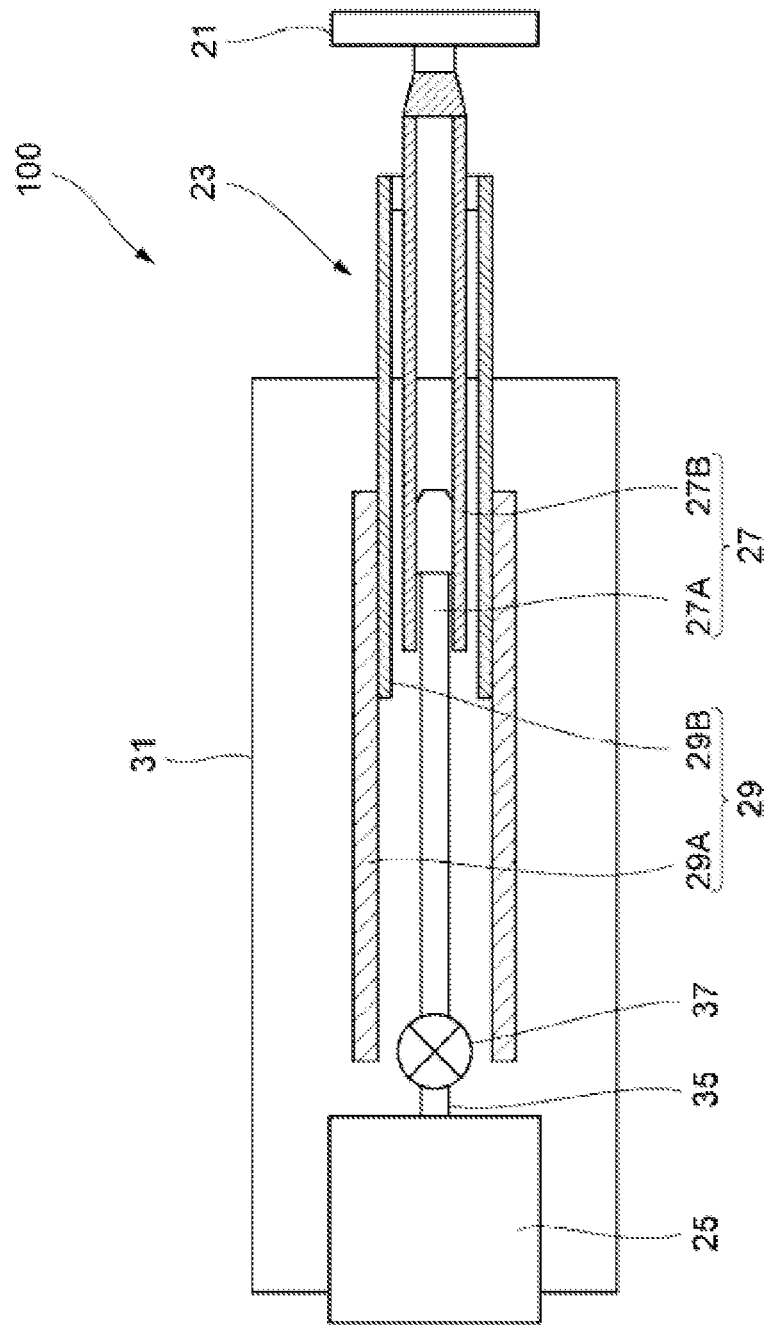
FIG. 4 is a schematic plan view of the main part of the steering device shown in FIG. 1 as viewed from below.

FIG. 3 is a schematic side view of a main part of the steering device 100 shown in FIG. 1 as viewed from a lateral side. FIG. 4 is a schematic plan view of the main part of the steering device 100 shown in FIG. 1 as viewed from below.

As shown in FIGS. 1 to 3, the steering column shaft 23 includes a steering shaft 27 connected to the steering wheel 21 and a steering column 29 into which the steering shaft 27 is inserted.

The steering shaft 27 includes an inner shaft 27A and an outer shaft 27B. The inner shaft 27A and the outer shaft 27B are serration-fitted to each other, and are combined so as to be capable of transmitting a rotational torque and relatively displaceable in the axial direction.

The tabular steering column 29 through which the steering shaft 27 is inserted includes an outer column 29A and an inner column 29B. The outer column 29A and the inner column 29B are combined such that the outer column 29A and the inner column 29B can be telescopically operated. The steering column 29 may have a collapsible structure in which, when an axial impact is applied to the steering column 29 at the time of a collision, an entire length of the steering column 29 is reduced while energy caused by the impact is absorbed.

The steering column 29 is supported by a front support piece 31b and arear support piece 31c of the top bracket 31, and can be tilted. The tilt position adjustment mechanism and a telescopic position adjustment mechanism may be of an electric type as shown in an eleventh embodiment (FIGS. 16 and 17) to be described later, or may be of a manual type. Such a steering column shaft 23 is known in the related art and a detailed description thereof will be omitted because a known configuration can be applied thereto. In the following description, the front support piece 31b and the rear support piece 3 of the top bracket 31 are omitted as shown in FIGS. 1 and 4.

The reaction force generator 25 includes an electric motor (not shown) that operates as the reaction force actuator. The reaction force generator 25 uses the electric motor as a drive source, reduces a rotational speed of the electric motor or increase a rotational drive force by a warm, a worm wheel, and the like, and applies a reaction force against steering to the steering column shaft 23 via the drive shaft 35. The reaction force generator 25 controls the electric motor and various sensors according to an instruction from an ECU 43.

The reaction force generator 25 is fixed to an attachment portion 31a (see FIG. 3) of the top bracket 31 on a vehicle body front side. In this case, the steering shaft 27 and the reaction force generator 25 are fixed to the vehicle body by the same fixing member (top bracket 31). The fixing member for fixing the reaction force generator 25 to the vehicle body is not limited thereto, and may be a number separated from the fixing member for fixing the steering shaft 27 to the vehicle body side. In both cases, the reaction force generator 25 and the steering shaft 27 are fixed to the vehicle body separately from each other.

The reaction force generator 25 may further include an additional member in addition to the configuration of the reaction force actuator and the like described above. The top bracket 31 is disposed so as to cover a vehicle interior space behind a dash panel 33 fixed integrally with the vehicle body.

A tip end of the drive shaft 35 of the reaction force generator 25 is connected to a front ed portion of the inner shaft 27A of the steering shaft 27 via the joint 37. That is, the joint 37 is disposed closer to a steering wheel 21 side than the reaction force generator 25 is. The tilt position adjustment mechanism and the telescopic position adjustment mechanism are disposed closer to the steering wheel 21 side than the joint 37 is.

The joint 37 connects the drive shaft 35 and the inner shaft 27A so as to be tiltable. The joint 37 can employ a known structure, and details of the structure can refer to, for example, JP-A-8-295246, JP-A-2008-174239, and the like as appropriate. Further, as the joint 37, a Tractor joint, a Rzeppa joint, a Weiiss joint a Thompson joint, a Yordak joint, a Hobson joint a Malpezzzi joint, and the like may be adopted.

In this configuration, the drive shaft 35 of the reaction force generator 25 and the inner shaft 27A of the steering shaft 27 that are connected to each other by the joint 37 are disposed on a straight line without being inclined with respect to each other when viewed from a lower side of the vehicle body shown in FIG. 4. The steering shaft 27 and the reaction force generator 25 are connected to each other via the joint 37, and are fixed to the vehicle body independently of each other. Therefore, even when a position of the steering shaft 27 is adjusted by the tilt position adjustment mechanism, an installation position of the reaction force generator 25 does not moves inside the vehicle body and the reaction force generator 25 maintains a state of being fixed to the vehicle body. That is, the reaction force generator 25 is fixed to the vehicle body side by a support structure that does not follow a position adjustment operation of the steering column 29 performed by the tilt position adjustment mechanism.

Figure 5:
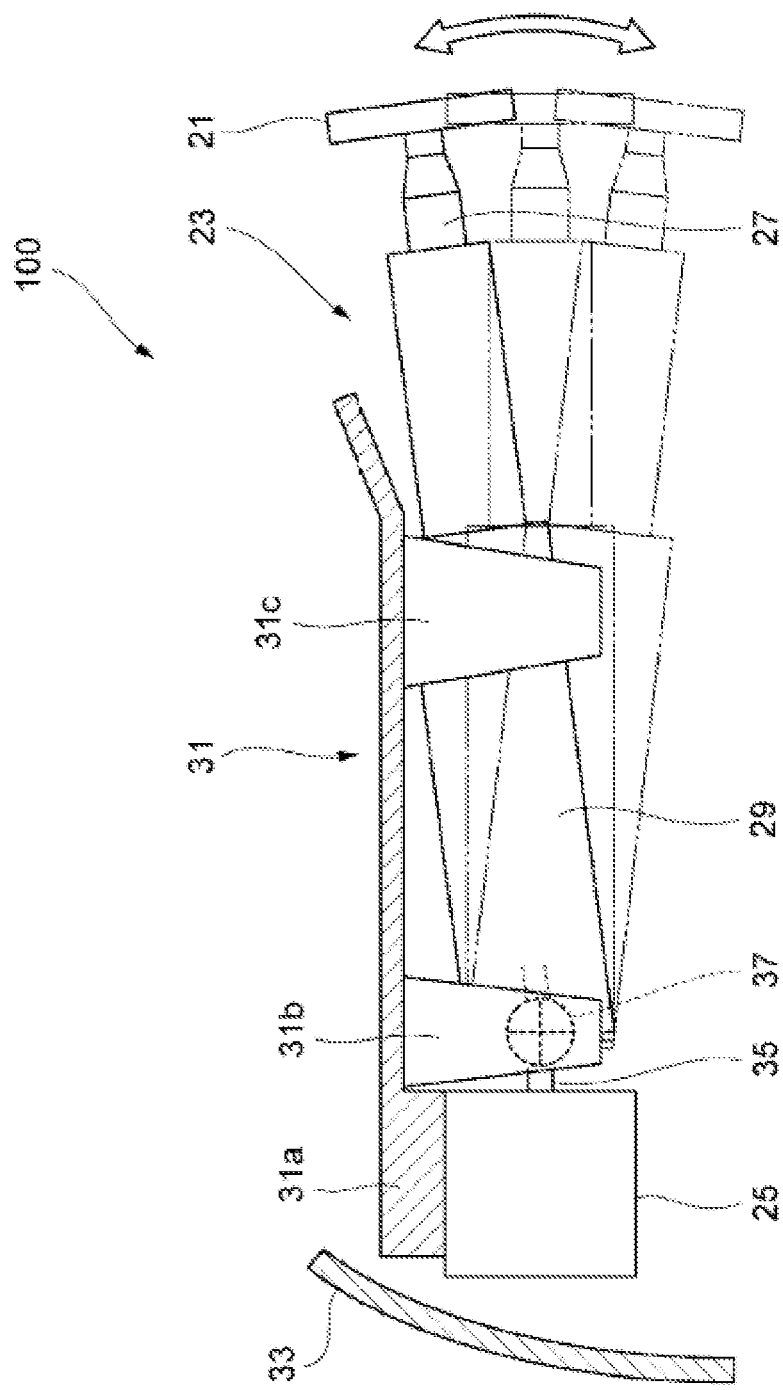
FIG. 5 is a schematic side view showing a state in which the steering device is tilted.

FIG. 5 is a schematic side view showing a state in which the steering device 100 is tilted. As shown in FIG. 5, due to the tilt operation of the steering column shaft 23, the drive shaft 35 and the inner shaft 27A are connected to each other in a state where the drive shaft 35 and the inner shaft 27A can be bent with the joint 37 as a bending point position. At this time, when the steering device 100 is viewed from a lateral side of the vehicle, a rotation center of the tilt operation and a position of the joint 37 are configured to coincide with each other. When viewed from a lateral side of the vehicle body, the drive shaft 35 and the inner shaft 27A are connected to each other in a straight line or in a bent manner. In an example of FIG. 5, the drive shaft 35 and the inner shaft 27A form a straight line at a central position (neutral position) in an adjustment range of the tilt position, and axial directions of the drive shaft 35 and the inner shaft 27A coincide with each other.

According to the steering device 100 of the present embodiment, since the reaction force generator 25 is fined to the top bracket 31 by the attachment portion 31a, a weight of the reaction force generator 25 is not applied to the steering column shaft 23. Therefore, the steering column shaft 23 is stably supported by the top bracket 31 without advertently rotating (tilting) on a tilt pivot (a support shaft on which the steering column 29 and the front support piece 31b of the top bracket 31 are rotatably supported) at the time of the tilt operation. Further, it is not necessary to reinforce a periphery of the tilt pivot to increase the rigidity thereof and a weight of the steering device 100 can be reduced.

Since a power supply cable (not shown in FIGS. 1 to 5) of the reaction force generator 25 does not move at the time of the tilt operation, the cable is not damaged by rubbing.

Further, since the reaction force generator 25 is faced to the vehicle body side, restriction on arrangement of a clutch or the like connected to the reaction force generator 25 is reduced, and the degree of freedom in design can be improved.

The steering column shaft 23 that is a movable side at the time of the tilt operation, and the reaction force generator 25 are supported by the same the top bracket 31. Therefore, the reaction force generator 25 can be assembled to the vehicle body as one component (unit) combined with the steering column shaft 23, and assemblability of the steering device 100 can be improved.

Further, the inner shaft 27A of the steering shaft 27 and the drive shaft 35 of the reaction force generator 25 are assembled to the vehicle body in a state of being connected to each other via the joint 37. Therefore, higher alignment accuracy can be obtained as compared with a case where both members are individually attached to the vehicle body and then the shafts are connected to each other. Accordingly, an attachment error is reduced, and the rotation operation, the tilt operation, and the telescopic operation of the steering shaft 27 can be performed more smoothly.

When the steering shaft 27 and the drive shaft 35 of the reaction force generator 25 are connected to each other in an inclined manner, a rotational angular velocity and a rotational torque transmitted from the drive shaft 35 to the steering shaft 27 fluctuate. The fluctuation of the rotational angular velocity and the rotational torque increases as a joint angle (inclination angle) of the joint 37 increases. The fluctuation is propagated to the steering wheel 21 as a reaction, and may give a sense of discomfort to the driver who operates the steering wheel 21.

Therefore, it is preferable that the reaction force generator 25 adjusts the generated reaction force according to the joint angle of the joint 37 so as to cancel at least a part, preferably all, of the fluctuation of the rotational angular velocity and the rotational torque, in order not to give the driver a sense of discomfort.

In this case, a relationship between the rotational angular velocity and the rotational torque for each joint angle of the joint 37 is stared in a storage unit (not shown) in a form of a mathematical expression, a map, and the like. Then, a sensor (not shown) for detecting the joint angle of the joint 37 and a rotational phase (rotational angle) of the joint 37 is provided, and based on a detection value from the sensor and the relationship for each joint angle stored in the storage unit, the fluctuation of the rotational angular velocity and the rotational torque transmitted by the joint 37 is obtained, and an assist torque for canceling the obtained fluctuation is generated from the reaction force generator 25. The assist torque may be set by using information of both the joint angle of the joint 37 and the rotational phase of the joint 37, or may be set by detecting only one of the joint angle of the joint 37 and the rotational phase of the joint 37.

As the sensor fee detecting the joint angle of the joint 37, in addition to a sensor for directly detecting the joint angle of the joint 37, for example, a sensor for detecting an inclination angle of the steering column 29 or a height position of the steering wheel 21, which is a factor equivalent to the joint angle of the joint 37, may be used. As the sensor, for example, a displacement sensor can be used. When the joint angle of the joint 37 is calculated using the detection value of the sensor, for example, a standard value (nominal value or the like) of the joint angle (the inclination angle of the steering column 29, the height position of the steering wheel 21) set in advance can be used as a reference value.

As the sensor for detecting the rotational phase of the joint 37, in addition to a sensor for directly detecting the rotational phase of the joint 37, for example, a sensor for detecting a rotational phase (rotational angle) of the steering shaft 27 or the steering wheel 21, which is a factor equivalent to the rotational phase of the joint 37, may be used. As the sensor, for example, a rotation sensor including an encoder, a steering-side resolver provided in the reaction force generator 25, or the like can be used.

Further, it is preferable that an inner diameter of the steering column 29 is larger than an outer diameter of the joint 37, and the joint 37 is disposed inside the steering column 29. For example, the outer diameter of the joint 37 may be configured to be smaller than an inner diameter of the inner column 29B. In this case, an axial length can be reduced to achieve a compact configuration, and the joint 37 can be reliably protected.

Second Embodiment

Next, a steering device according to a second embodiment will be described. In the following description, constituent elements that are the same as or common to those of the first embodiment are denoted by the same reference numerals, and descriptions thereof are omitted as appropriate.

Figure 6:
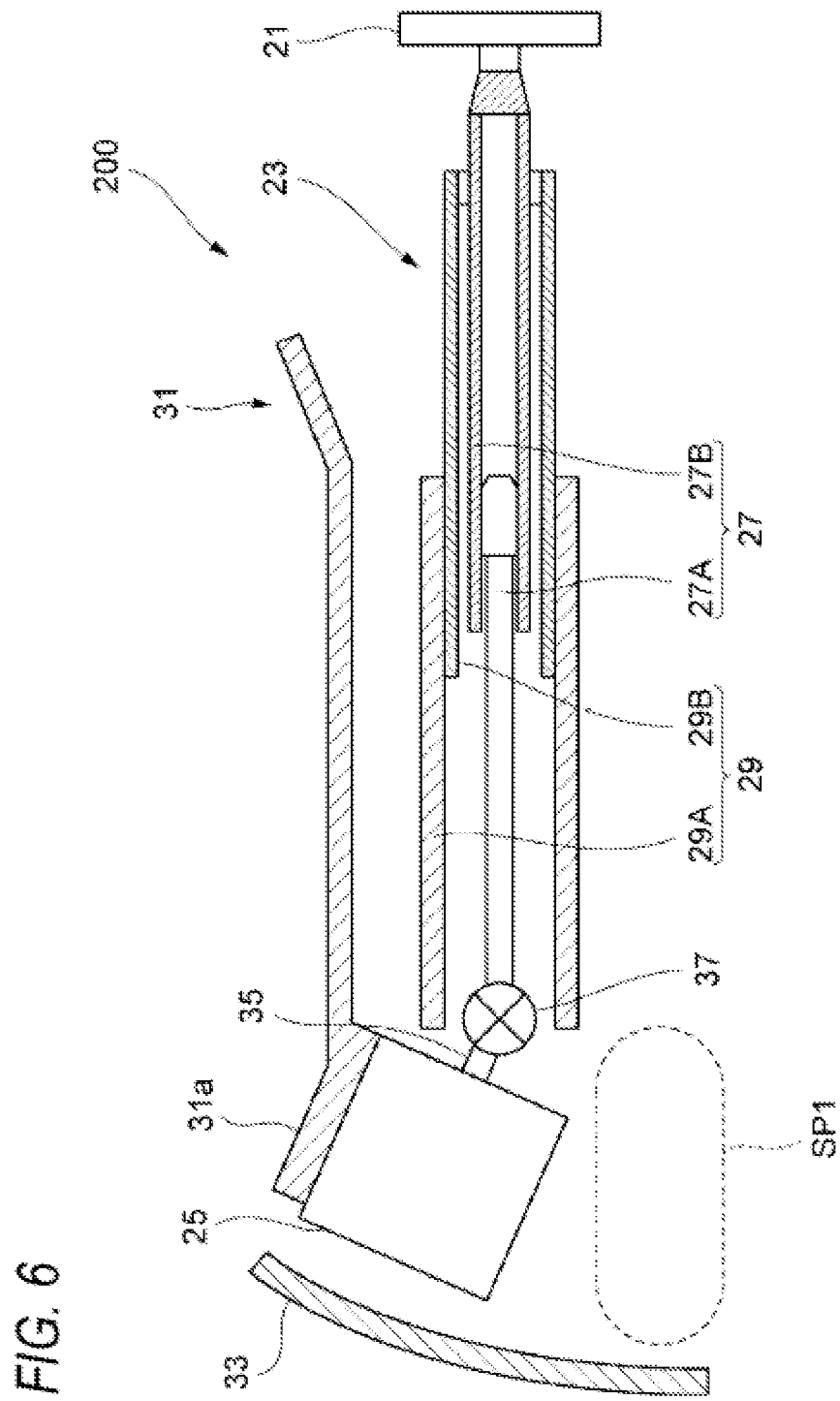
FIG. 6 is a schematic side view of a main part of a steering device according to a second embodiment as viewed from a lateral side.

FIG. 6 is a schematic side view of a main part of a steering device 200 according to the second embodiment as viewed from a lateral side.

In the steering device 200 of the present embodiment, the reaction force generator 25 is disposed so as to be inclined upward. That is, the reaction force generator 25 is fixed to the attachment portion 31a of the top bracket 31 that is inclined upward, and the drive shaft 35 is disposed to be inclined upward toward a front of the vehicle body. Further, the drive shaft 35 is inclined downward toward a rear of the vehicle body and is connected to the joint 37. Here, the inclination angle of the attachment portion 31a may be set according to a range in which a tilt position can be adjusted, a length of the top bracket 31 in the vehicle body front-rear direction, and the like. For example, the inclination angle of the attachment portion 31a may be set to coincide with an angle formed by the drive shaft 35 and the inner shaft 27A at a central position in the range in which the tilt position can be adjusted.

As described in the first embodiment, when the steering shaft 27 and the drive shaft of the reaction force generator 25 are connected to each other in an inclined manner, the rotational angular velocity and the rotational torque transmitted from the drive shaft 35 to the steering shaft 27 fluctuate. Therefore, in the present embodiment, in consideration of the inclination of the connection (for example, inclination of the attachment portion 31a), the reaction force generator 25 also adjusts the generated reaction force so as to cancel at least a part, preferably all, of the fluctuation of the rotational angular velocity and the rotational torque, in order not to give the driver a sense of discomfort.

According to the steering device 200 of the present configuration, the operation and effect of the first embodiment can be obtained, and an empty space SP1 below the reaction force generator 25 can be secured when compared with FIG. 1 of the first embodiment since the reaction force generator 25 is disclosed to be inclined upward.

The empty space SP1 widens a foot space of the driver seat in the upper-lower direction, and expands the foot space. Accordingly, comfort in the driver seat can be improved. In general, components such as a brake pedal and an accelerator pedal, a duct of an air conditioner (automatic air conditioner), a knee airbag, electrical components, and the like are disposed in the foot space of the driver seat. When the driver reclines, a position of a toe may approach a tip end of the space. Even in such a case, since the foot space is widened a Layout with a margin of space is possible, and the degree of freedom in design is increased.

Third Embodiment

Next, a steering device according to a third embodiment will be described.

Figure 7:
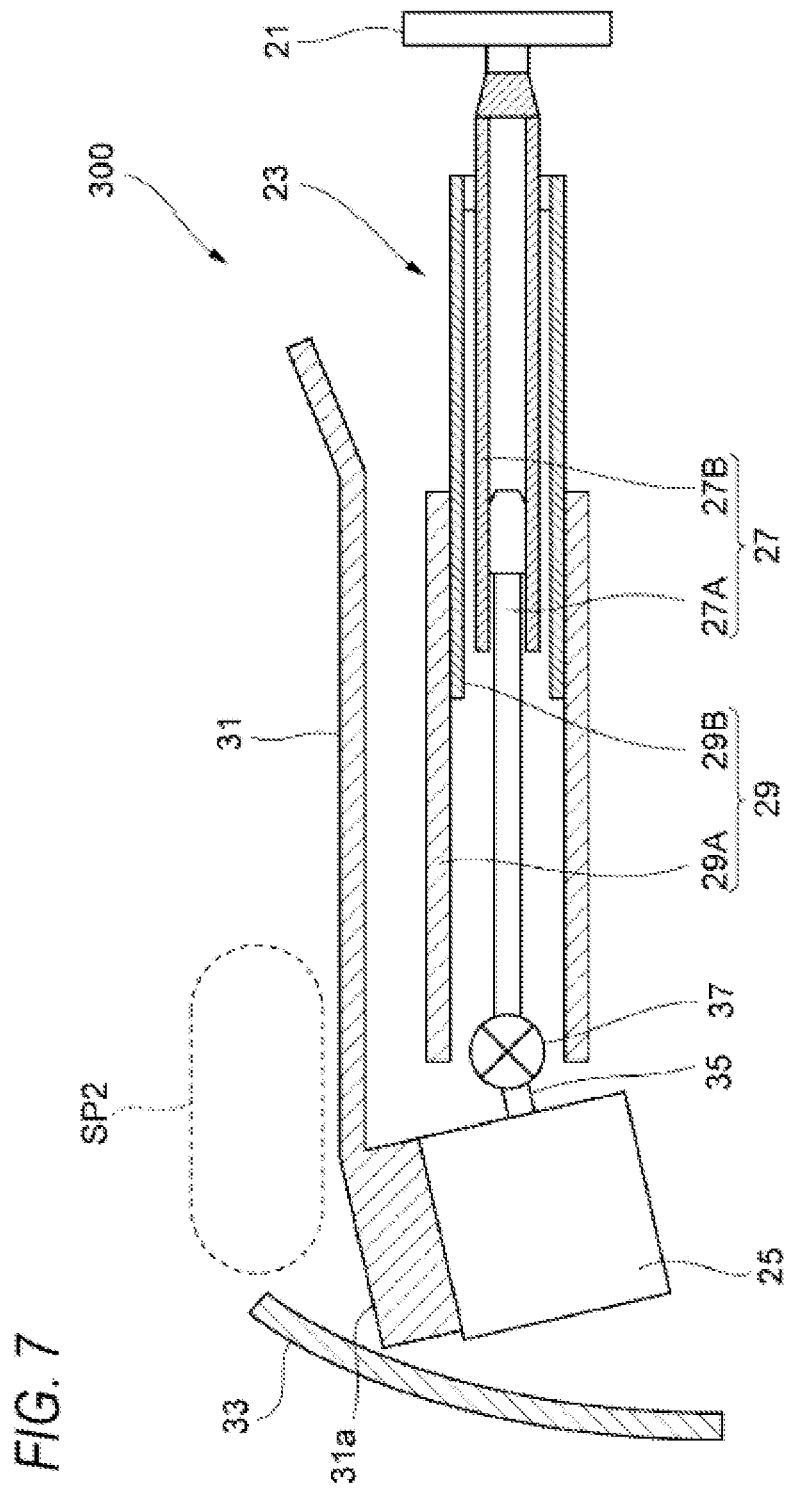
FIG. 7 is a schematic side view of a main part of a steering device according to a third embodiment as viewed from a lateral side.

FIG. 7 is a schematic side view of a main part of the steering device 300 according to the third embodiment as viewed from a lateral side.

In the steering device 300 of the present embodiment, the reaction force generator 25 is disposed to be inclined downward. That is, the reaction force generator 25 is fixed to the attachment portion 31a of the top bracket 31 that is inclined downward, and the drive shaft 35 is disposed to be inclined downward toward a front of the vehicle body. Further, the drive shaft 35 is inclined upward toward a rear of the vehicle body and is connected to the joint 37. Here, the inclination angle of the attachment portion 31a may be set according to a range in which a tilt position can be adjusted, a length of the top bracket 31 in the vehicle body front-rear direction, and the like. In the present embodiment, the reaction force generator 25 also adjusts the generated reaction force in consideration of the inclination of the connection (for example, inclination of the attachment portion 31a).

According to the steering device 300 of the present configuration, the operation and effect of the first embodiment can be obtained, and an empty space SP2 above the reaction force generator 25, that is, above the top bracket 31, can be secured when compared with FIG. 1 of the first embodiment since the reaction force generator 25 is disposed to be inclined downward.

In general, electrical components of the vehicle body, a head-up display unit, and the like are disposed on an instrument panel above the top bracket 31. By securing the empty space PS2, a layout that avoids interference with these components, units, and the like is easily possible, and the degree of freedom in design is improved.

Fourth Embodiment

Next, a steering device according to a fourth embodiment will be described.

Figure 8:
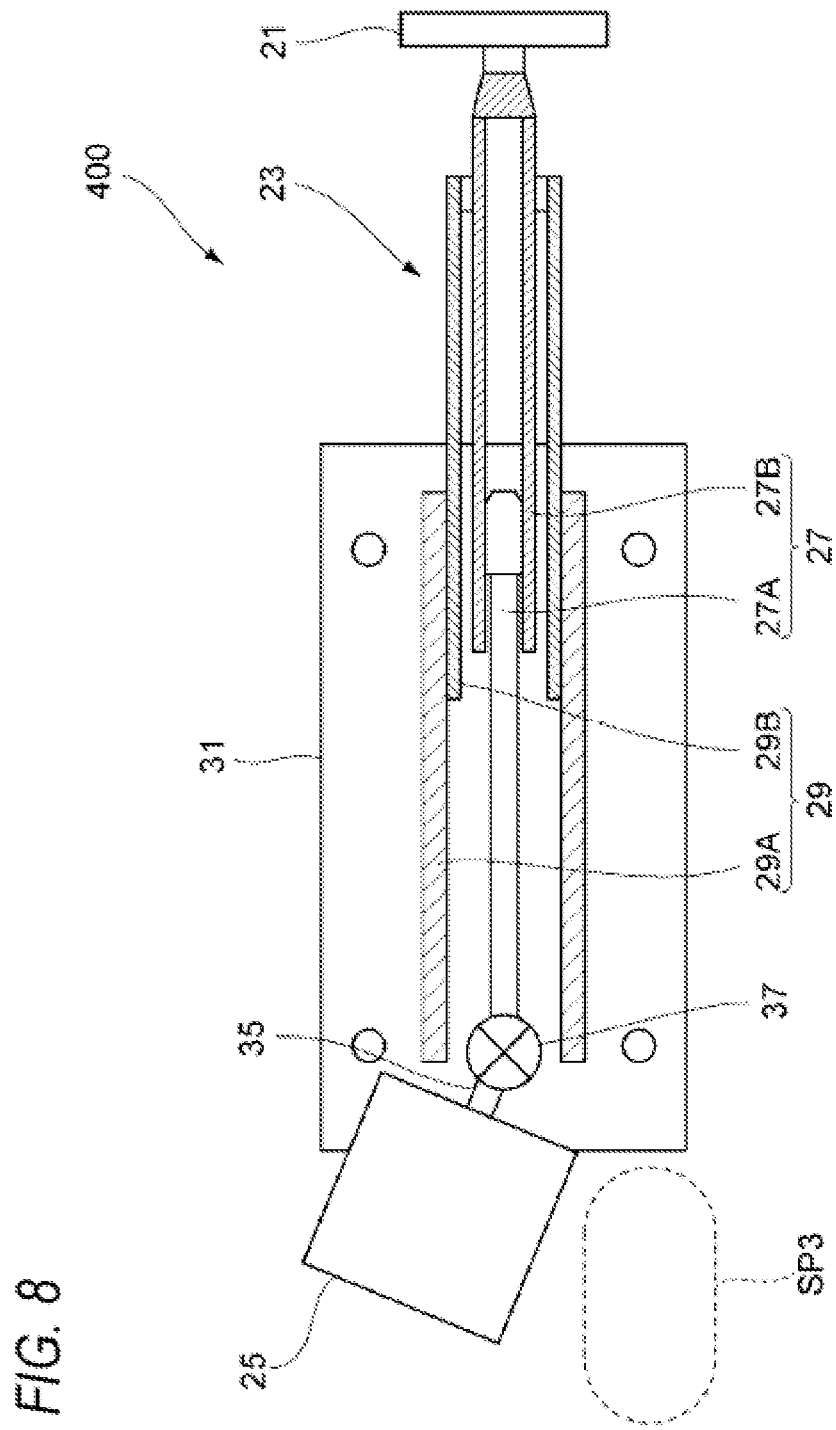
FIG. 8 is a schematic plan view of a main part of a steering device according to a fourth embodiment as viewed from below.

FIG. 8 is a schematic plan view of a main part of a steering device 400 according to the fourth embodiment as viewed from below.

In the steering device 400 of the present embodiment the reaction force generator is disposed to be inclined with respect to an axial direction of the steering shaft 27. Tat is, in a top view of the vehicle body in which the bottom view of FIG. 8 is reversed, the reaction force generator 25 is disposed to be inclined to a left side of the vehicle body. That is, in a top view of the vehicle body, the reaction force generator 25 is fixed to the top bracket 31 so as to be inclined leftward, and the drive shaft 35 is disposed to be inclined leftward toward a front of the vehicle body. A rear end of the drive shaft 35 is connected to the joint 37 so as to be inclined toward a rear of the vehicle body. The inclination angle of the reaction force generator 25 (drive shaft 35) may be set according to a range in which a tilt position can be adjusted, a function of the joint 37, and the like. In the present embodiment, the reaction force generator 25 also adjusts the generated reaction force in consideration of the inclination of the connection. Further, a shape of the attachment portion 31a of the top bracket 31 may be different from a shape in FIG. 3 of the first embodiment according to the inclination angle of the reaction force generator 25.

According to the steering device 400 of the present configuration, the operation and effect of the first embodiment can be obtained, and an empty space SP3 on a right side of the reaction force generator 25 can be secured when compared with FIG. 4 of the first embodiment since the reaction force generator 25 is disposed to be inclined leftward toward the front of the vehicle body in the top view of the vehicle body. For example, when the reaction force generator 25 includes a worm reducer, it is assumed that a motor or the like is configured to protrude from the housing. Even in such a case, by setting a protruding position and a protruding direction to a side of the reaction force generator 25 opposite to an empty space SP3 side, the empty space SP3 can be reliably secured, and the degree of freedom in layout can be further improved.

Fifth Embodiment

Next, a steering device according to a fifth embodiment will be described.

Figure 9:
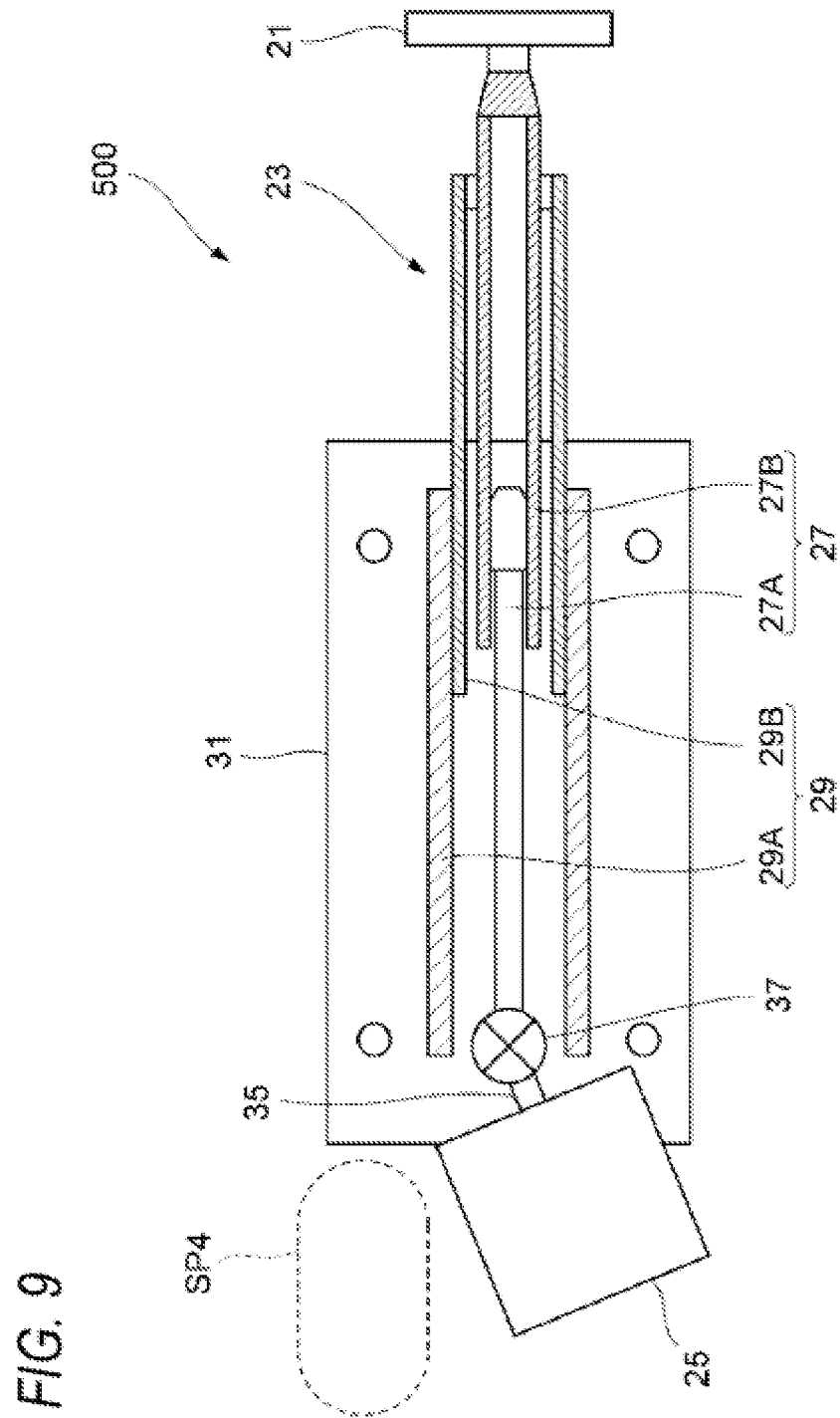
FIG. 9 is a schematic plan view of a main part of a steering device according to a fifth embodiment as viewed from below.

FIG. 9 is a schematic plan view of a main put of a steering device 500 according to the fifth embodiment as viewed from below.

In the steering device 500 of the present embodiment, the reaction force generator 25 is disposed to be inclined with respect to the axial direction of the steering shaft 27. That is, in a top view of the vehicle body in which the bottom view of FIG. 9 is reversed, the reaction force generator 25 is disposed to be inclined to a right side of the vehicle body. That is, in a top view of the vehicle body the reaction force generator 25 is fixed to the top bracket 31 so as to be inclined rightward, and the drive shaft 35 is disposed to be inclined rightward toward a front of the vehicle body in the top view as viewed from above the vehicle body. Further, the drive shaft 35 is inclined toward a rear of the vehicle body and is connected to the joint 37. The inclination angle of the reaction force generator 25 (drive shaft 35) may be set according to a range in which a tilt position can be adjusted, a function of the joint 37, and the like. In the present embodiment the reaction force generator 25 also adjusts the generated reaction force in consideration of the inclination of the connection. Further, a shape of the attachment portion 31a of the top bracket 31 may be different from a shape in FIG. 3 of the first embodiment according to the inclination angle of the reaction force generator 25.

According to the steering device 500 of the present configuration, the operation and effect of the first embodiment can be obtained, and an empty space SP4 on a left side of the reaction force generator 25 can be secured when compared with FIG. 4 of the first embodiment since the reaction force generator 25 is disposed to be inclined rightward in the top view of the vehicle body.

In the steering devices 400 and 500 according to the fourth and fifth embodiments described above, by securing the empty spaces SP3 and SP4, a layout that avoids interference with each component is easily possible, and the degree of freedom in design can be improved.

Further, by appropriately combining the second or third embodiment in which the reaction force generator 25 is inclined in the upper-lower direction and the fourth or fifth embodiments in which the reaction force generator 25 is inclined in the left-right direction, for example, an empty space can be selectively secured at a desired position such as an upper right position or a lower left position. Thus, by inclining the reaction force generator 25 in the upper-lower direction and the left-right direction at the same time, a larger empty space can be secured, and the degree of freedom in design such as the layout is further improved.

Sixth Embodiment

Next, a steering device according to a sixth embodiment will be described.

Figure 10:
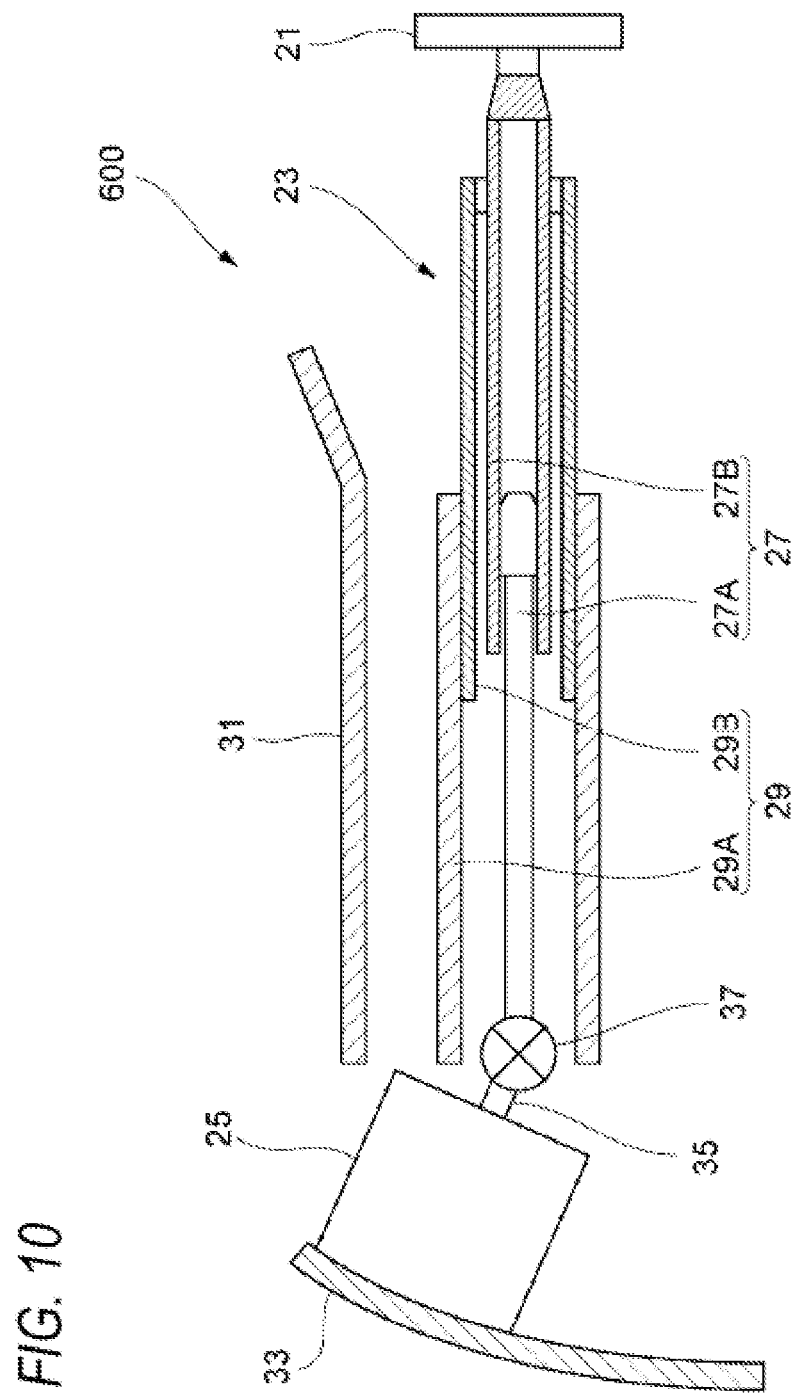
FIG. 10 is a schematic side view of a mam part of a steering device according to a sixth embodiment as viewed from a lateral side.
Figure 11:
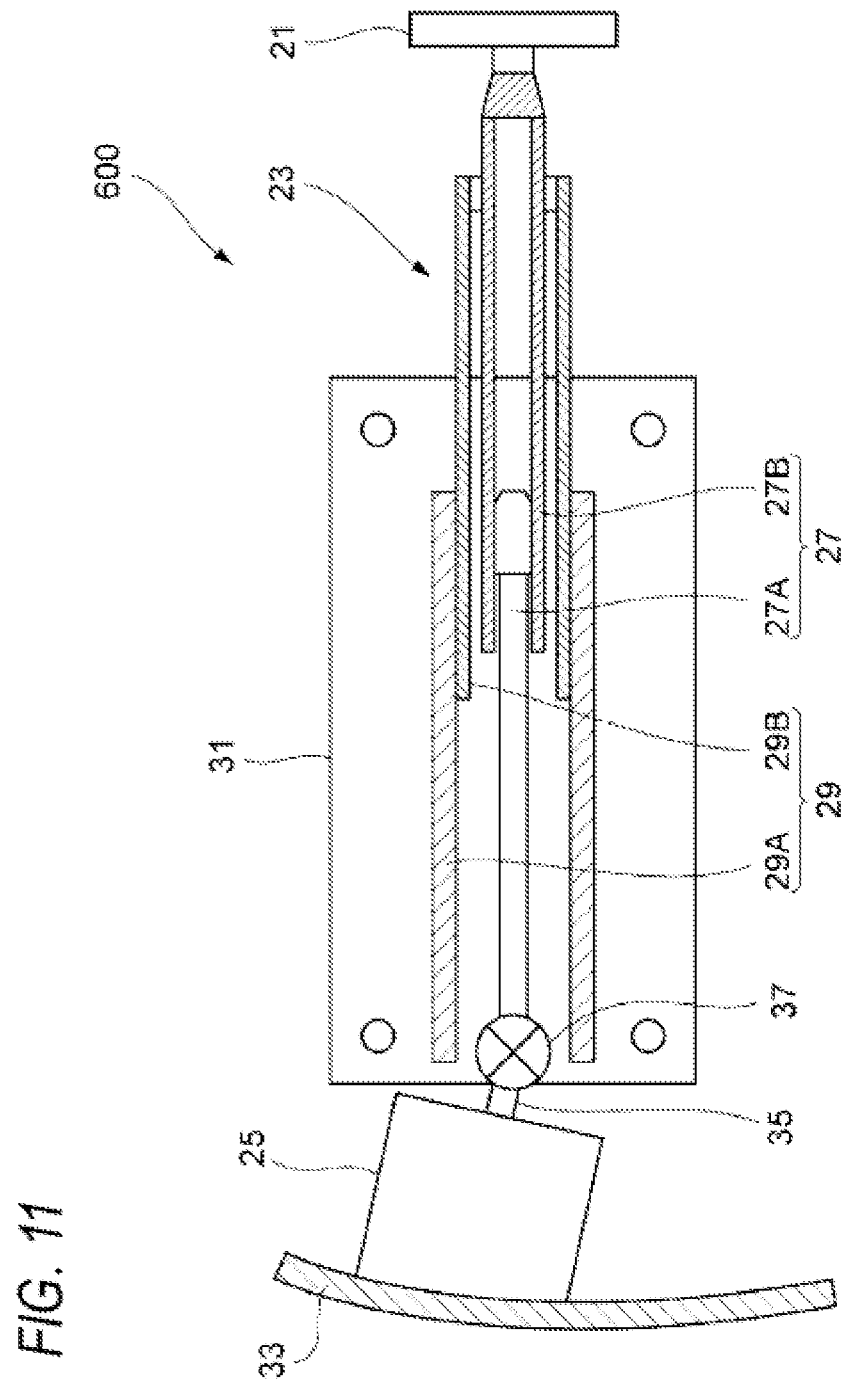
FIG. 11 is a schematic plan view of the main art of the steering device shown in FIG. 10 as viewed from below.

FIG. 10 is a schematic side view of a main part of a steering device 600 according to a sixth embodiment as viewed from a lateral side. FIG. 11 is a schematic plan view of the main put of the steering device 600 shown in FIG. 10 as viewed from below.

In the steering device 600 of the present embodiment, the reaction force generator 25 is fixed to the dash panel 33. Other configurations are the same as those of the second to fifth embodiments. In this case, an empty space can also be selectively secured by inclining the reaction force generator 25 in the upper-lower direction and the left-right direction. Further, when a position of the steering shaft 27 is adjusted by the tilt position adjustment mechanism, the reaction force generator 25 also does not move from the vehicle body and maintains a state of being fixed to the dash panel on the vehicle body side.

Seventh Embodiment

Next, a steering device according to a seventh embodiment will be described. In the seventh embodiment to a tenth embodiment to be described below, a configuration example of a mechanical steering system will be described instead of the steer-by-wire steering system.

Figure 12:
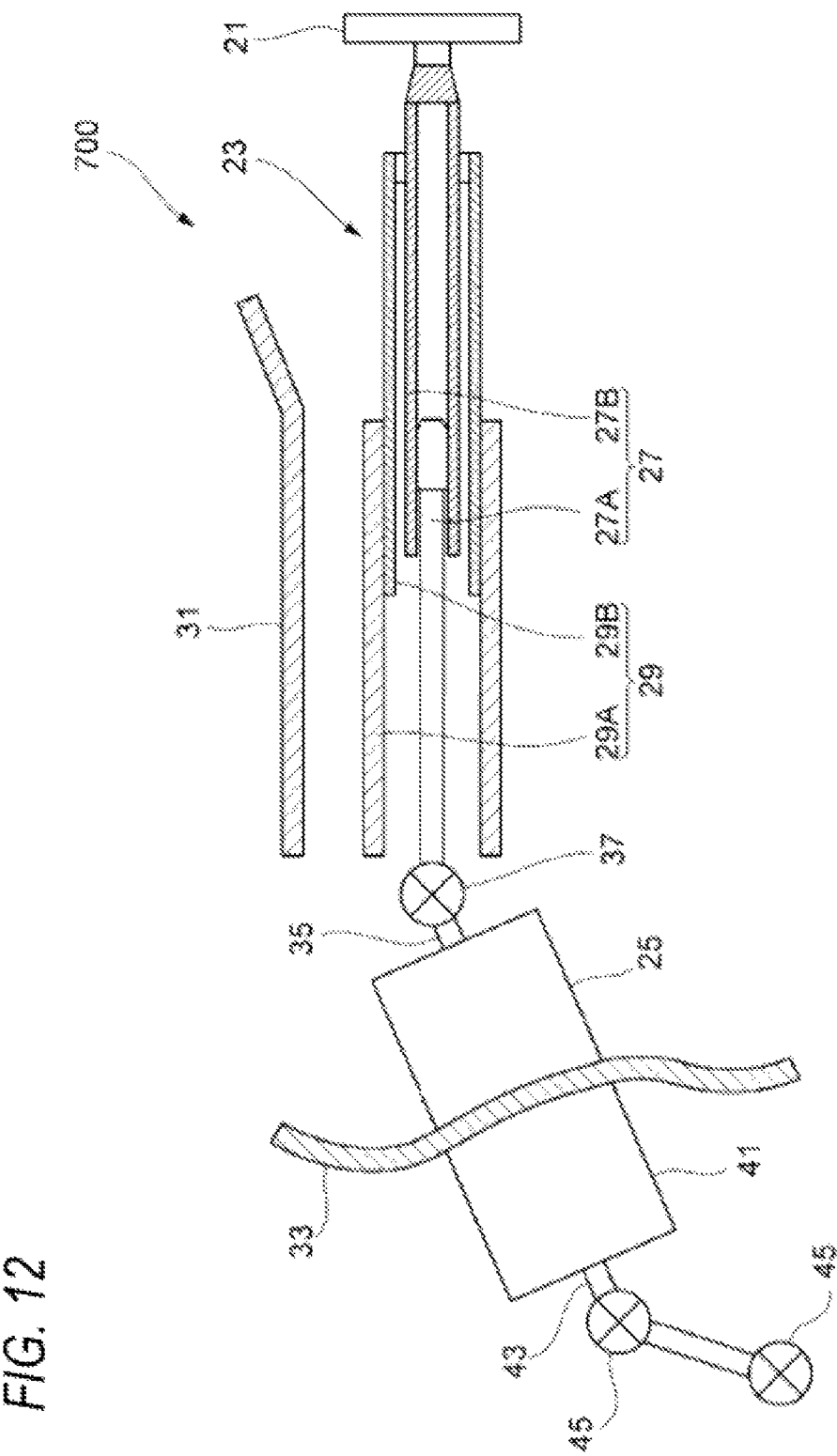
FIG. 12 is a schematic side view of a main part of a steering device according to a seventh embodiment as viewed from a lateral side.

FIG. 12 is a schematic side view of a main part of a steering device 700 according to the seventh embodiment as viewed from a lateral side.

In the steering device 700 of the present embodiment, the reaction force generator 25 is fixed to the dash panel 33, and a clutch 41 is connected to the reaction force generator 25 with the dash panel 33 interposed therebetween. An output shaft 43 of the clutch 41 is appropriately connected, via a joint 45, to a steering drive unit that steers the steered wheels, and the steered wheels are steered according to a steering operation of the steering wheel 21. Other configurations are the same as those of the sixth embodiment.

Eighth Embodiment

Next, a steering device according to an eighth embodiment will be described.

Figure 13:
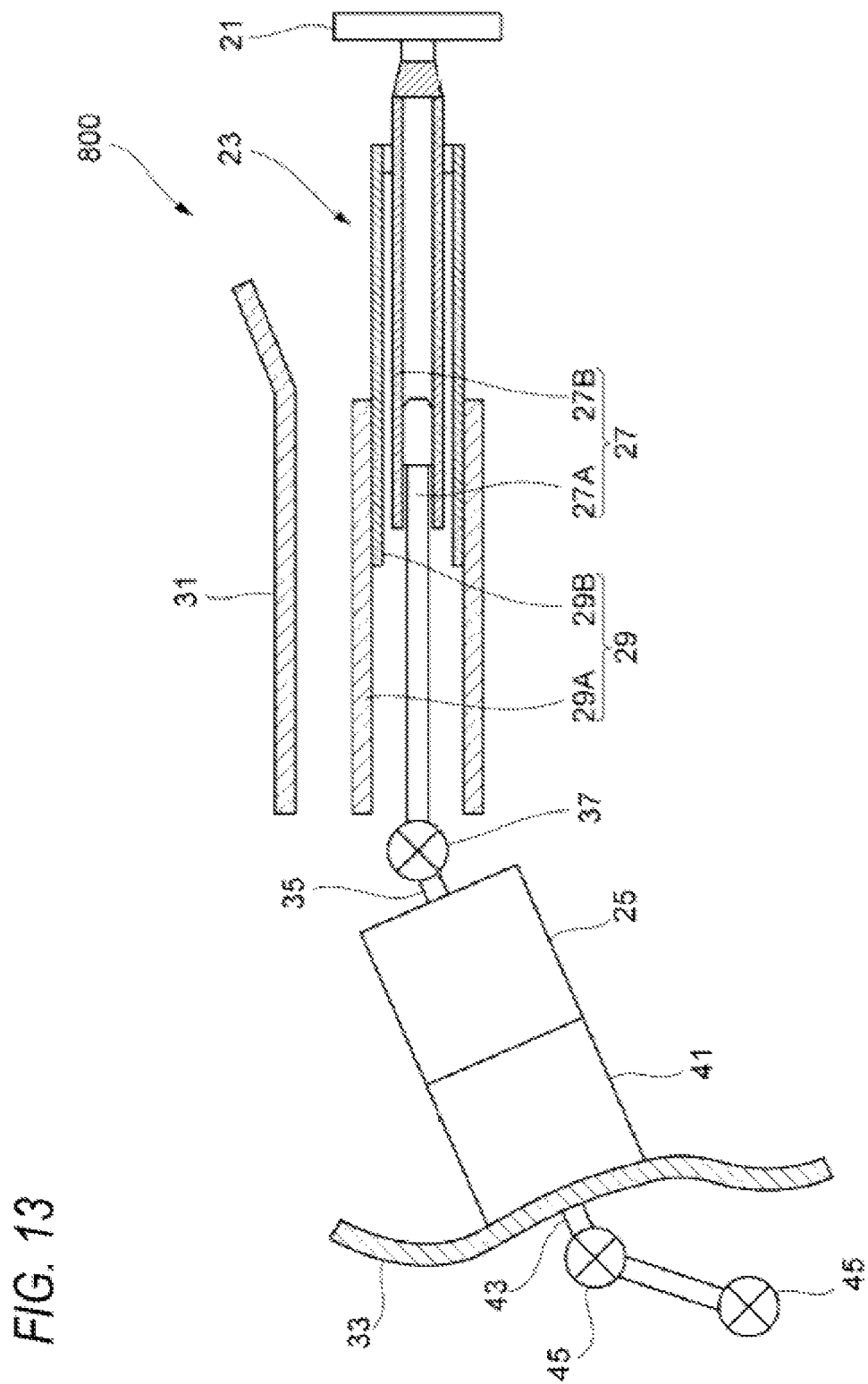
FIG. 13 is a schematic side view of a main part of a steering device according to an eighth embodiment as viewed from a lateral side.

FIG. 13 is a schematic side view of a main part of a steering device 800 according to the eighth embodiment as viewed from a lateral side.

In the steering device 800 of the present embodiment, the reaction force generator and the clutch 41 are integrated. Further, by fixing the clutch 41 to the dash panel 33, both the reaction force generator 25 and the clutch 41 are disposed on an interior side of the vehicle body.

Ninth Embodiment

Next, a steering device according to a ninth embodiment will be described.

Figure 14:
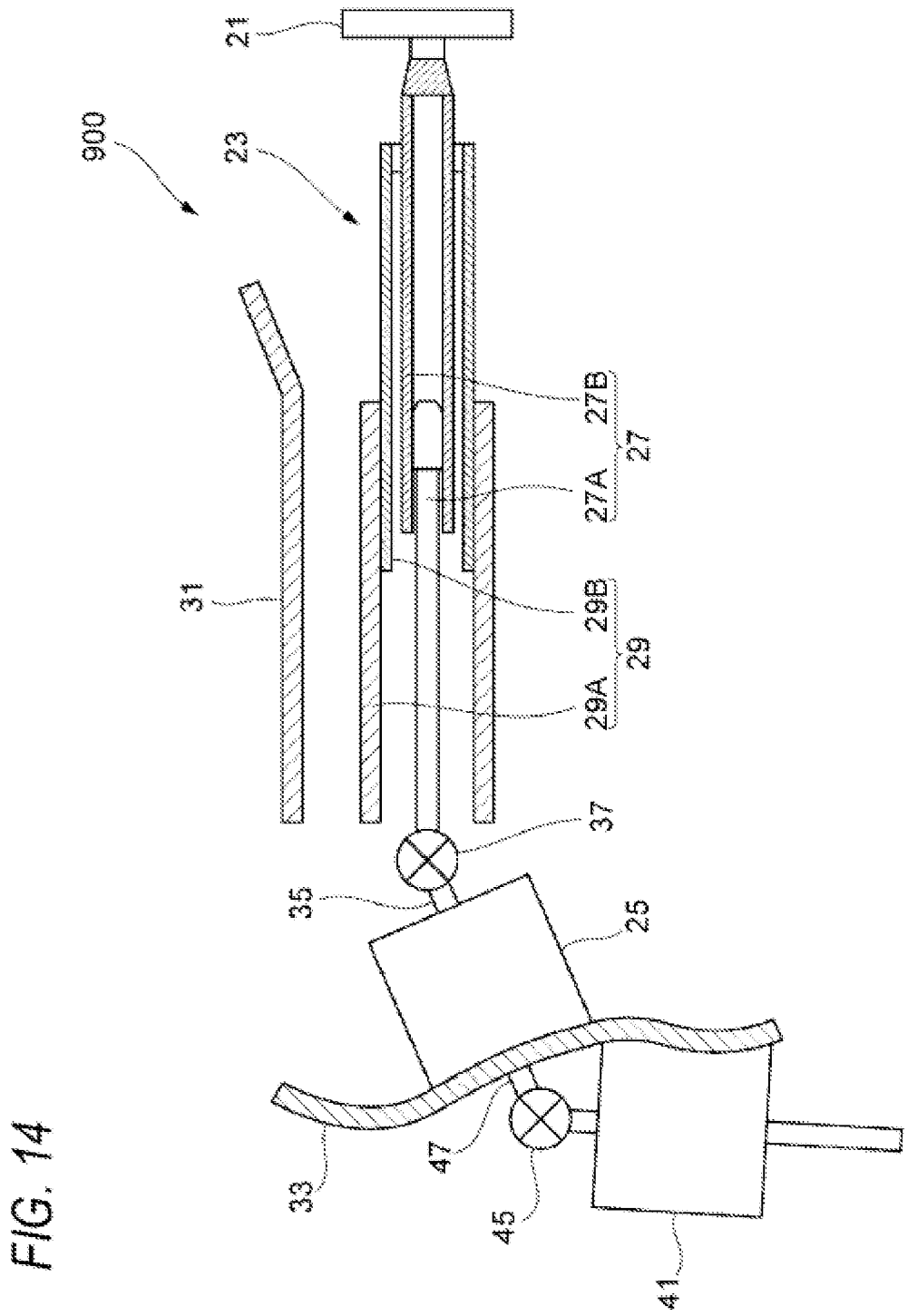
FIG. 14 is a schematic side view of a main part of a steering device according to a ninth embodiment as viewed from a lateral side.

FIG. 14 is a schematic side view of a main part of a steering device 900 according to the ninth embodiment as viewed from a lateral side.

In the steering device 900 of the present embodiment, the reaction force generator is fixed to the dash panel 33, and the drive shaft 35 of the reaction force generator 25 protruding from the dash panel 33 toward a front of the vehicle body is connected to the output shaft 43 of the clutch 41 via the joint 49.

Tenth Embodiment

Next, a steering device according to a tenth embodiment will be described.

Figure 15:
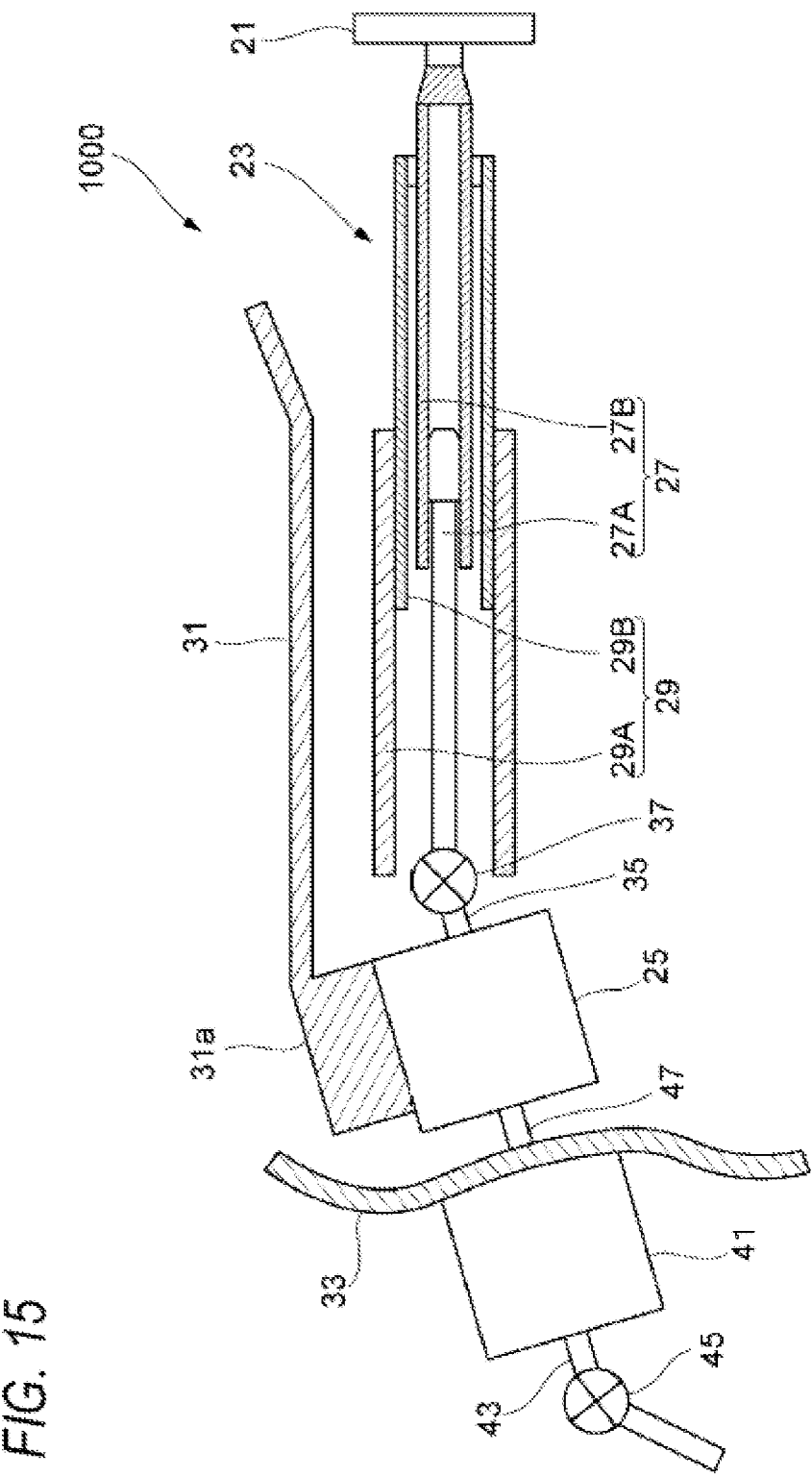
FIG. 15 is a schematic side view of a main part of a steering device according to a tenth embodiment as viewed from a lateral side.

FIG. 15 is a schematic side view of a main part of a steering device 1000 according to the tenth embodiment as viewed from a lateral side.

In the steering device 1000 of the present embodiment, the reaction force generator is fixed to the attachment portion 31a of the top bracket 31, and the clutch 41 is fixed to the dash panel 33. Similarly to the third embodiment (FIG. 7), the attachment portion 31a is configured such that a front part of the top bracket 31 is inclined downward. Therefore, the drive shaft 35 is disposed to be inclined downward toward a front of the vehicle body and fixed to the attachment portion 31a. Further, the dive shaft 35 is inclined upward toward a rear of the vehicle body and is connected to the joint 37. The dive shaft 35 of the reaction force generator 25 protrudes toward the dash panel 33, penetrates the dash panel 33, and is connected to the clutch 41. The output shaft 43 of the clutch 41 is connected to a steering drive unit (not shown) via the joint 45.

According to the steering devices 700, 800, 900, and 1000 of the seventh to tenth embodiments described above, the reaction force generator 25 can be disposed without interfering with the tilt operation of the steering column and without lowering the assemblability.

Eleventh Embodiment

Next, a steering device according to an eleventh embodiment will be described.

Figure 16:
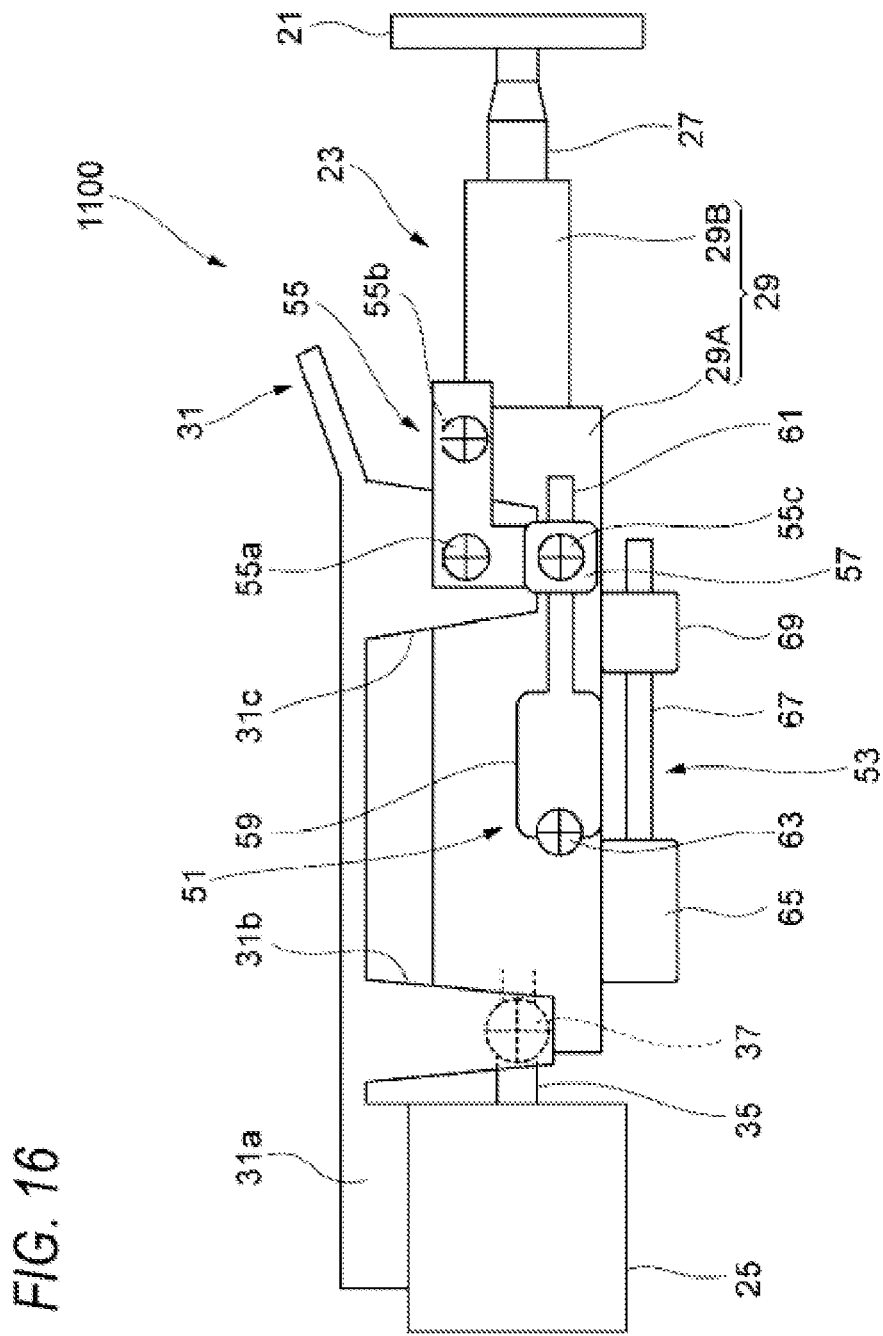
FIG. 16 is a schematic side view of a mam part of a steering device according to an eleventh embodiment as viewed from a lateral side.
Figure 17:
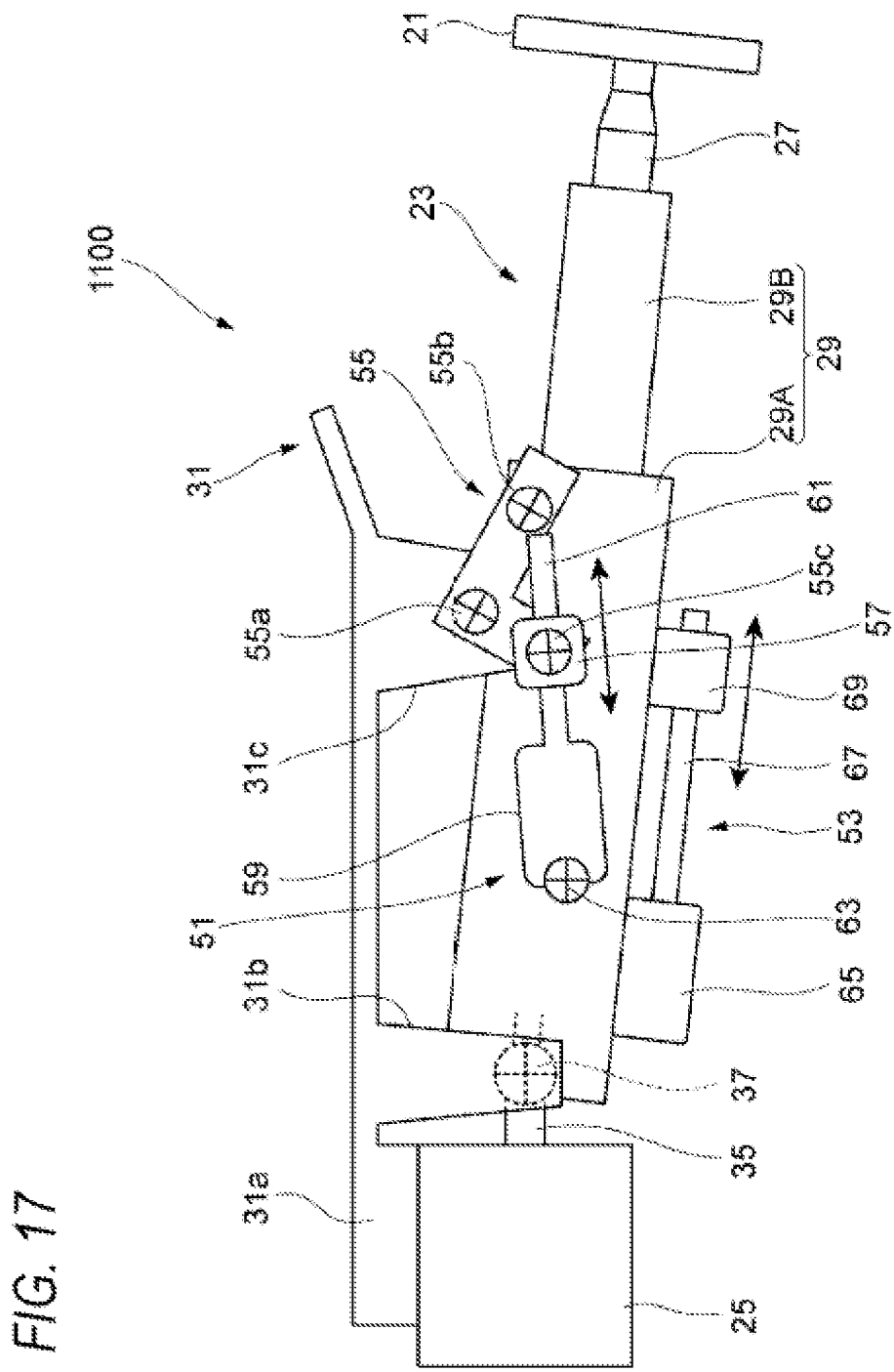
FIG. 17 is a schematic side view of the main portion showing a state in which the steering device shown in FIG. 16 is tilted and telescopically operated.

FIG. 16 is a schematic side view of a main part of a steering device 1100 according to the eleventh embodiment as viewed from a lateral side. FIG. 17 is a schematic side view of the main portion showing a state in which the steering device 1100 shown in FIG. 16 is tilted and telescopically operated.

As shown in FIGS. 16 and 17, in the steering device 1100 of the present embodiment, a tilt operation and a telescopic operation are realized by an electric motor.

The steering device 1100 includes the steering wheel 21, the steering column shaft 23, the reaction force generator 25, a tilt drive unit 51, and a telescopic drive unit 53.

The reaction force generator 25 is fixed to the attachment portion 31a of the top bracket 31. The outer column 29A of the steering column 29 is supported by the front support piece 31b via a support shaft (not shown) so as to be tiltable in the upper-lower direction. The drive shaft 35 of the reaction force generator 25 is connected to an inner shaft (not shown) of the steering shaft 27 by the joint 37.

An L-shaped stay 55 is attached to the rea support piece 31c of the top bracket 31 so as to be rotatable around a fulcrum 55a. A rear part of the outer column 29A is tiltably supported at one end portion 55b of the stay 55, and a tilt slider 57 is tiltably provided at the other end portion 55c of the stay 55. The tilt slider 57 is screwed to a screw shaft 61 of a tilt motor 59, and is moved along the screw shaft 61 under rotational drive of the screw shaft 61 by the tilt motor 59. The tilt motor 59 is supported by the outer column 29A so as to be tiltable around a support shaft 63.

When the tilt motor 59 is driven, the tilt slider 57 moves along the screw shaft 61, and the other end portion 55c of the stay 55 moves in the front-rear direction. In this way, the stay 55 rotates around the fulcrum 55a. Thus, the outer column 29A is tilted around the support shaft connecting the outer column 29A to the front support piece 316 of the top bracket 31. In this way, the tilt operation is realized. Further, even when the position of the steering shaft 27 is adjusted by the tilt position adjustment mechanism, the reaction force generator 25 maintains a state of being fixed to the top bracket 31 that tiltably supports the steering shaft 27, and does not move from the vehicle body.

A telescopic motor 65 is fixed to the outer column 29A. A telescopic slider 69 is provided and screwed to a screw shaft 67 of the telescopic motor 65. The telescopic slider 69 is fixed to the inner column 29B.

When the telescopic motor 65 is driven, the telescopic slider 69 moves along the screw shaft 67, and thus the inner column 29B moves forward and backward in the axial direction. At this time, although not shown, the inner shaft and the outer shaft of the steering shaft 27 also move forward and backward in the axial direction. In this way, the telescopic operation is realized.

The joint 37 shown in FIGS. 16 and 17 may coincide with the support shaft (tilt pivot), on which the front support piece 316 of the top bracket 31 supports the outer column 29A, in the axial direction of the steering shaft 27. In this case, the mechanism for the tilt operation can be simplified, and since the tilt pivot is disposed on a front side of the outer column 29A, a stroke of the tilt operation can be enlarged.

Twelfth Embodiment

Next, a steering device according to a twelfth embodiment will be described.

Figure 18:
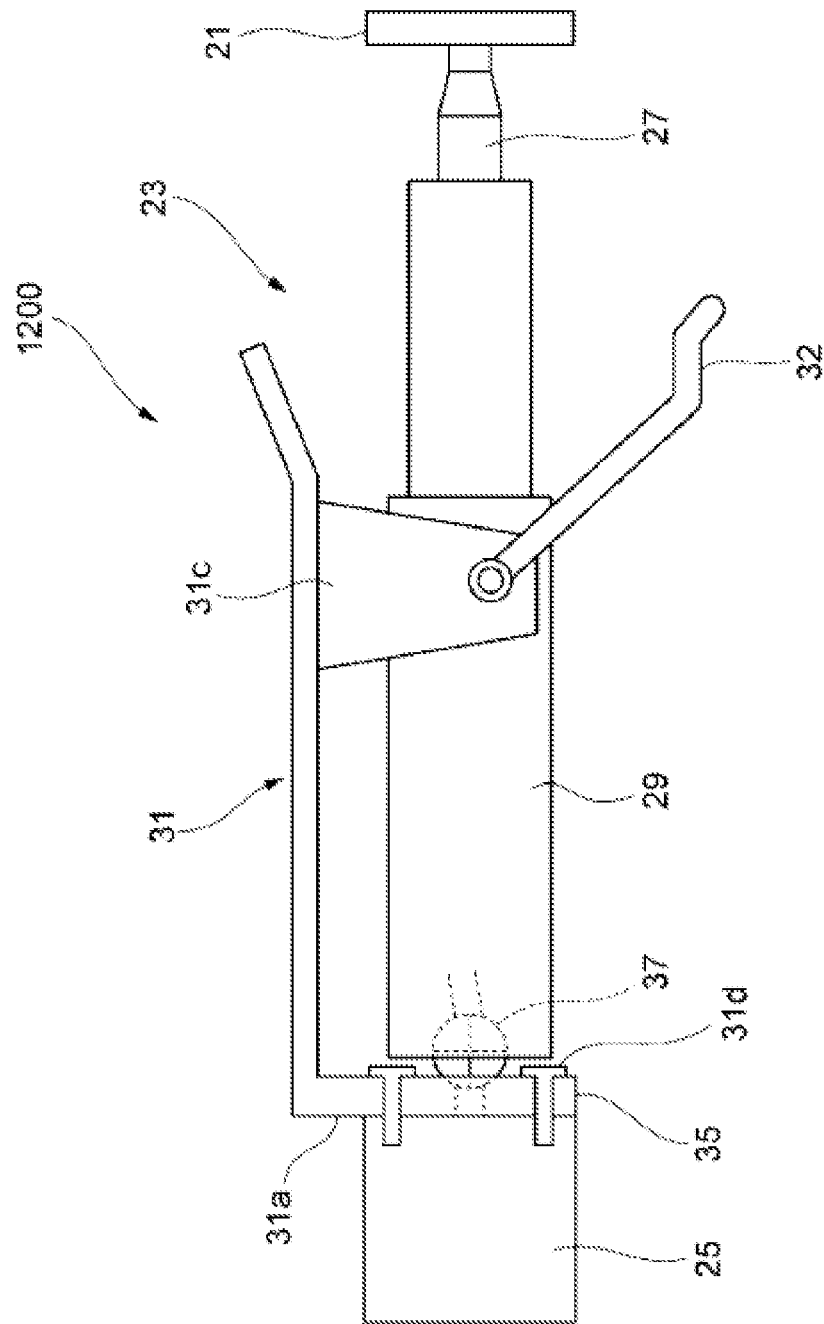

FIG. 18 is a schematic side view of a main part of a steering device 1200 according to the twelfth embodiment as viewed from a lateral side. FIG. 18 shows a configuration example in which a tilt position of the steering wheel 21 is manually adjusted.

In the steering device 1200 of the present embodiment the top bracket 31 is formed in an L shape, and the reaction force generator 25 is fixed to the attachment portion 31a by an attachment member 31d. As the attachment member 314, for example, a bolt for serration fitting may be used A tilt lever 32 is provided on the rear support piece 31c of the top bracket 31 and is used to adjust the tilt portion of the steering column shaft 23 (steering wheel 21).

Figure 19:
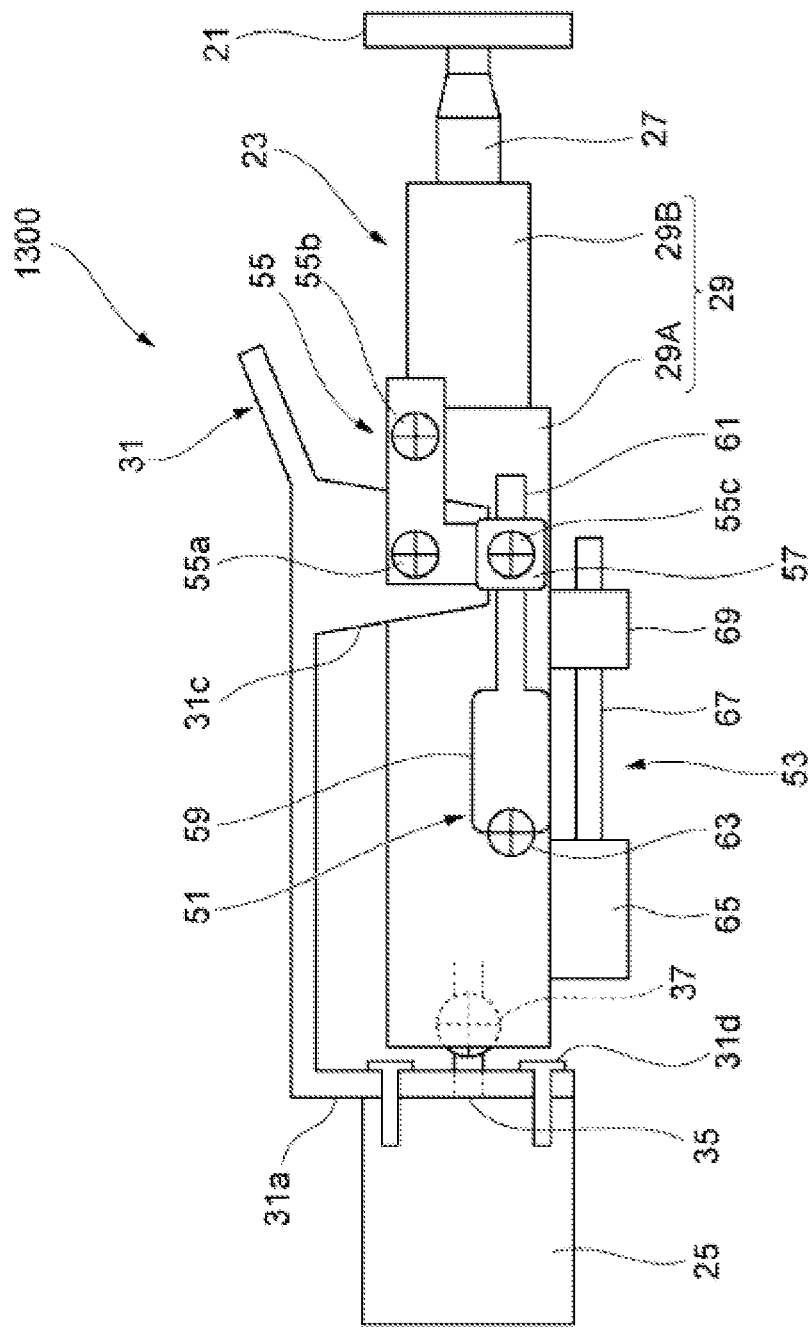
FIG. 19 is a schematic side view of a main part of a steering device having another configuration according to the twelfth embodiment as viewed from the lateral side.
Figure 20:
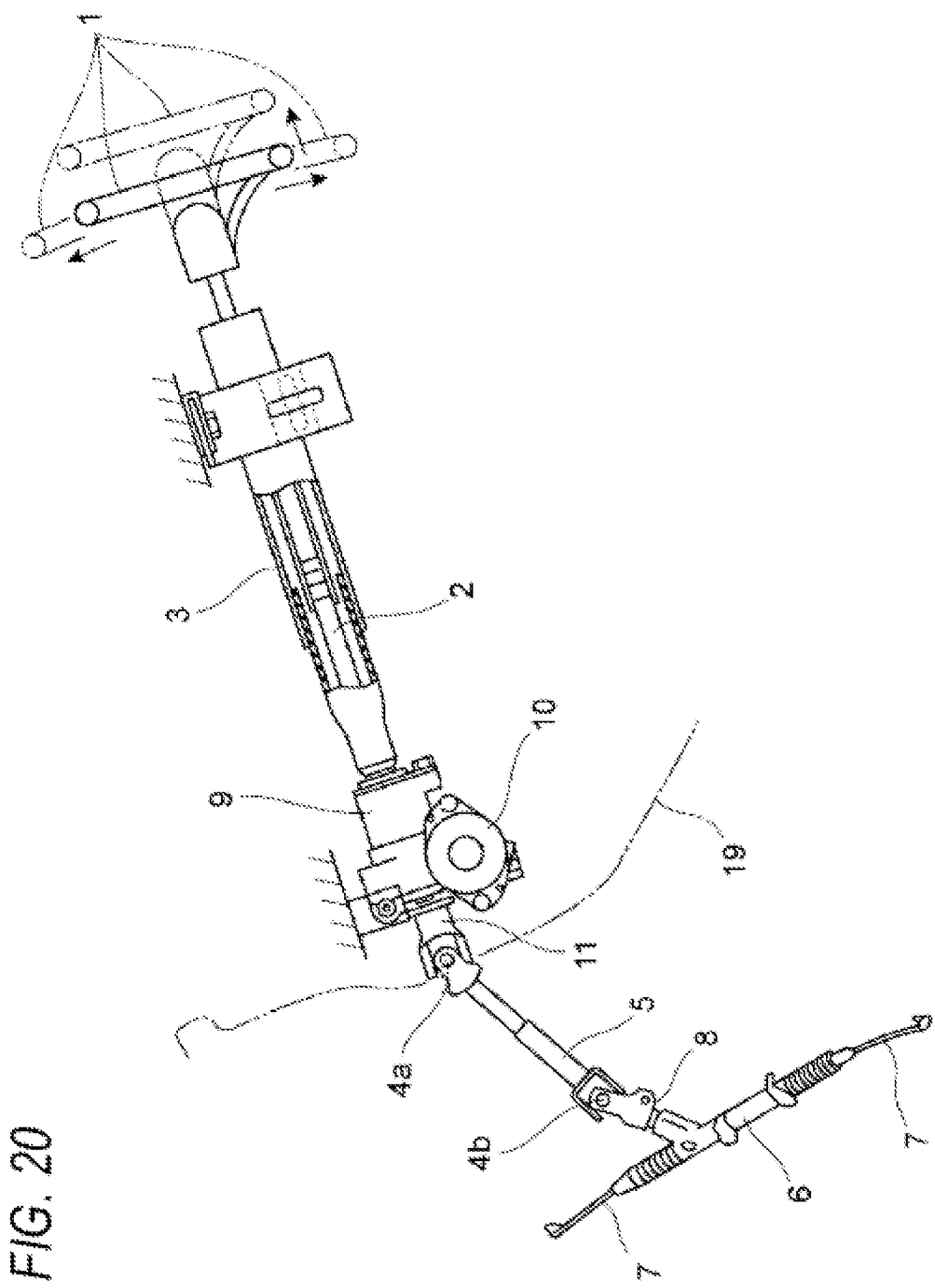
FIG. 20 is a schematic configuration diagram showing an example of a steering device for automobile in the related art.
Figure 21:
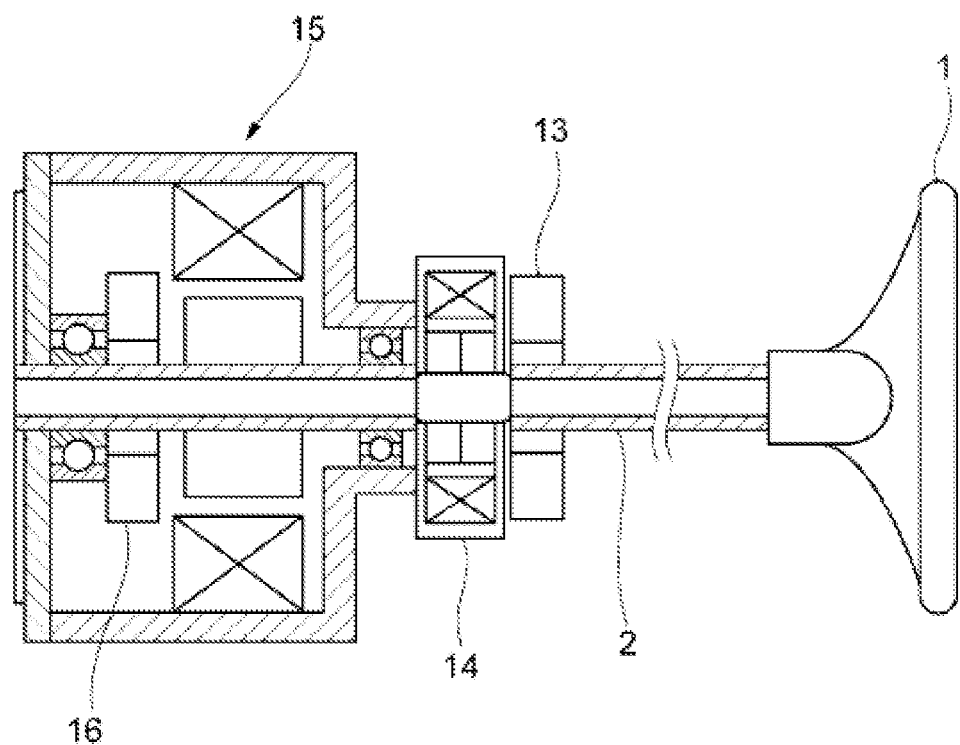
FIG. 21 is a cross-sectional view of a reaction force actuator.
Figure 22:
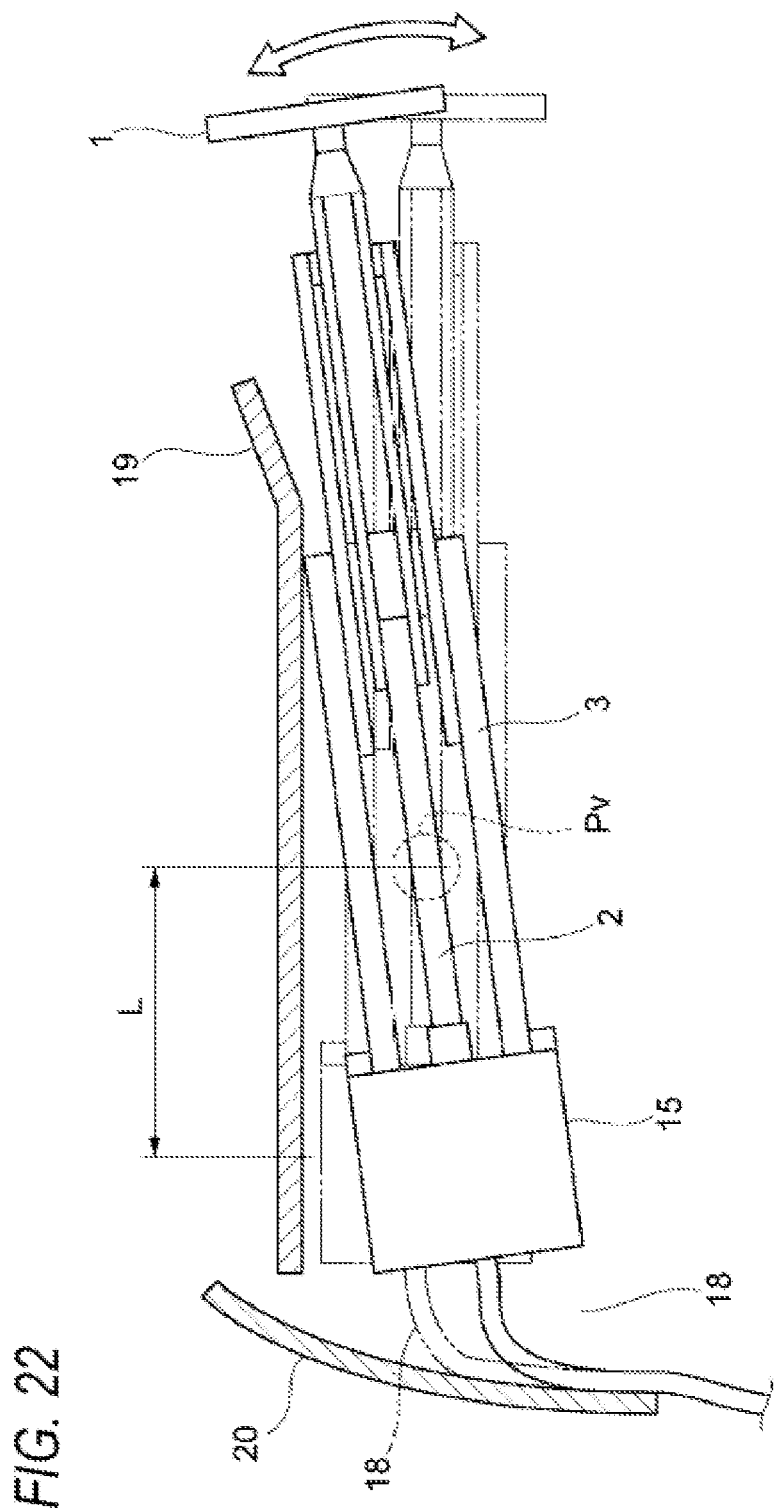
FIG. 22 is a view showing a state where a steer-by-wire reaction force actuator is fixed to a front end of a steering column and the steering column is tilted.

FIG. 19 is a schematic side view of a main part of a steering device 1300 having another configuration according to the twelfth embodiment as viewed from the lateral side. FIG. 19 shows a configuration example in which the tilt position of the steering wheel 21 is adjusted electrically. FIGS. 18 and 19 are different from each other only in whether the tilt position adjustment mechanism is of an electric type or a manual type, and other configurations are the same.

According to the steering devices 1200 and 1300 of the present configuration, a length of the top bracket 31 in the vehicle front-rear direction can be configured to be shorter than that in the first embodiment. Therefore, a periphery of the steering device can be made compact and the degree of freedom in design is increased.

Further, by standardizing the configuration of the attachment portion, the tilt position adjustment mechanism of the steering device can be designed in a compatible manner regardless of whether the tilt position adjustment mechanism is of an electron type or a manual type. That is, the steering device can be modularized.

The present invention is not limited to the embodiments described above, and combinations of the respective configurations of the embodiments and modifications and applications by those skilled in the art based on the description of the specification and well-known techniques are also intended by the present invention and are included in the scope of the protection.

As described above, the following matters are disclosed in the present specification.

(1) A steering device including:
  a steering wheel;
  a steering shaft connected to the steering wheel;
  a steering column configured to rotatably support the steering shaft on an inner diameter side thereof and supported by a vehicle body;
  a tilt position adjustment mechanism configured to tilt the steering column; and
  a joint configured to connect the steering shaft with a fixed-side rotating body tiltably supported on a vehicle body side without being interlocked with a tilt operation performed by the tilt position adjustment mechanism, wherein
  the jot is disposed closer to a steering wheel side than the fixed-side rotating body is.

According to the steering device, in a steer-by-wire steering device, the fixed-side rotating body is coupled to the steering shaft via the joint that is disposed closer to a steering wheel side than the fixed-side rotating body is. Thus, a tilt operation of the steering column does not affect the fixed-side rotating body, and the fixed-side rotating body does not move due to the tilt operation. Therefore, the degree of freedom in arrangement of the fixed-side rotating body can be improved, and assemblability of the steering device can be improved.

(2) The steering device according to (1), wherein
  the fixed-side rotating body includes:
    a dive shaft, and
    a reaction force generator configured to generate, on the drive shaft, a reaction force corresponding to a steering operation applied to the steering wheel.

According to the steering device, the degree of freedom in arrangement of the reaction force generator can be improved.

(3) The steering device according to (2), wherein the reaction force generator does not follow a position adjustment operation of the steering column performed by the tilt position adjustment mechanism.

According to the steering device, the reaction force generator can be disposed without lowering the assemblability of the steering device, and the does not interfere with the tilt operation of the steering column.

(4) The steering device according to (2) or (3), wherein in an axial direction of the steering shaft a position of the joint coincides with a position of a tilt pivot of the tilt position adjustment mechanism.

According to the steering device, the mechanism for the tilt operation can be simplified, and since the tilt pivot is disposed on a front side of the steering column, a stroke of the tilt operation can be enlarged.

(5) The steering device according to any one of (2) to (4), wherein the reaction force generator is disposed to be inclined from the steering shaft via the joint.

According to the steering device, since the reaction force generator is disposed to be inclined with respect to the steering shaft, an empty space can be defined on a side opposite to an inclined side. Therefore, the degree of freedom in arrangement layout of members based on the empty space can be improved, and a wide residence space for the driver can be secured.

(6) The steering device according to any one of (2) to (5), wherein the steering shaft and the drive shaft of the reaction force generator are coupled to be inclined with respect to each other in a top view of the vehicle body.

According to the steering device, the degree of freedom in arrangement of components such as a brake pedal and an accelerator pedal is improved, and a layout with a margin of space is possible.

(7) The steering device according to any one of (2) to (5), wherein the steering shaft and the drive shaft of the reaction force generator are coupled to be inclined with respect to each other in a side view of the vehicle body.

According to the steering device, when the drive shaft of the reaction force generator is inclined upward and fixed to the vehicle body, a foot space of the driver seat is widened, and when the drive shaft of the reaction force generator is inclined downward and fixed to the vehicle body, a space above the instrument panel or the like is widened, and the degree of freedom in design is improved.

(8) The steering device according to any one of (2) to (5), wherein the steering shaft and the drive shaft of the reaction force generator are coupled to be inclined with respect to each other in a top view and a side view of the vehicle body.

According to the steering device, n empty space can be selectively secured at a desired position such as an upper right position or a lower left position. Thus, by inclining the reaction force generator 25 in the upper-lower direction and the let-right direction at the same time, a larger empty space can be secured, and the degree of freedom in design such as the layout is further improved.

(9) The steering device according to any one of (2) to (8), wherein an inner diameter of the steering column is larger than an outer diameter of the joint, and the joint is disposed inside the steering column.

According to the steering device, the inner diameter of the steering column is larger than the outer diameter of the joint, the joint is disposed inside the steering column, and thus an axial length can be reduced to achieve a compact configuration, and the joint can be reliably protected.

(10) The steering device according to any one of (2) to (9), wherein an axial direction of the drive shaft of the reaction force generator and the axial direction of the steering shaft coincide with each other at a central position in an adjustment range of the tilt position adjustment mechanism.

According to the steering device, a rotational angular velocity and a rotational torque corresponding to a joint angle can be easily corrected.

(11) The steering device according to any one of (2) to (10), wherein the reaction force generator generates the reaction force by which fluctuation of a rotational angular velocity and a rotational torque caused by the joint are corrected.

According to the steering device, a sense of discomfort caused by the fluctuation of the rotational angular velocity and the rotational torque is not given to a driver who operates the steering wheel.

(12) The steering device according to any one of (2) to (11), wherein the reaction force generator is fixed to a dash panel or a top bracket integrated with the vehicle body.

According to the steering device, since the reaction force generator is fixed to the dash panel or the top bracket, the reaction force generator can be easily attached to the vehicle body side, and the assemblability can be improved.

(13) The steering device according to any one of (2) to (11), wherein the reaction force generator and the steering column are supported by the same top bracket.

According to the steering device, rigidity can be improved and an assembly error can be reduced.

The present application is based on U.S. Provisional Application No. 62/835,769 filed on Apr. 19.2019, and the contents thereof are incorporated herein as reference.

REFERENCE SIGNS LIST

21: steering wheel
23: steering column shaft
25: reaction force generator (fixed-side rotating body)
27: steering shaft
29: steering column
31: top bracket
33: dash panel
35: drive shaft
37: joint
51: tilt drive unit
53: telescopic drive unit
100, 200, 300, 400, 500, 600, 700, 800, 900, 1000, 1100, 1200, 1300: steering device

The invention claimed is:
1. A steering device comprising:
a steering wheel;
a steering shaft connected to the steering wheel;
a steering column configured to rotatably support the steering shaft on an inner diameter side thereof and supported by a vehicle body;
a tilt position adjustment mechanism configured to tilt the steering column; and
a joint configured to connect the steering shaft with a fixed-side rotating body supported on a vehicle body side in an inclined manner without being affected by a tilt operation performed by the tilt position adjustment mechanism, wherein:
the joint is disposed closer to a steering wheel side than the fixed-side rotating body is; and in an axial direction of the steering shaft, a position of the joint coincides with a position of a tilt pivot of the tilt position adjustment mechanism;

the fixed-side rotating body includes:
a drive shaft; and
a reaction force generator configured to generate, on the drive shaft, a reaction force corresponding to a steering operation applied to the steering wheel;

the steering shaft and the drive shaft of the reaction force generator are coupled to be inclined with respect to each other in a side view of the vehicle body; and the reaction force generator is disposed to be inclined upward relative to horizontal and the drive shaft is inclined downward toward a rear of the vehicle body.

2. The steering device according to claim 1, wherein the reaction force generator does not follow a position adjustment operation of the steering column performed by the tilt position adjustment mechanism.

3. The steering device according to claim 1, wherein the reaction force generator is disposed to be inclined from the steering shaft via the joint.

4. The steering device according to claim 1, wherein an inner diameter of the steering column is larger than an outer diameter of the joint, and the joint is disposed inside the steering column.

5. The steering device according to claim 1, wherein the reaction force generator generates the reaction force by which fluctuation of a rotational angular velocity and a rotational torque caused by the joint are corrected.

6. The steering device according to claim 1, wherein the reaction force generator is fixed to a dash panel or a top bracket integrated with the vehicle body.

* * * * *